US012720621B2

(12) United States Patent
Lim et al.

(10) Patent No.: US 12,720,621 B2
(45) Date of Patent: Aug. 25, 2026

(54) DEVICE AND METHOD FOR ADAPTIVELY CONTROLLING PATH IN WIRELESS COMMUNICATION SYSTEM

(71) Applicant: Samsung Electronics Co., Ltd., Suwon-si (KR)

(72) Inventors: Jaijin Lim, Suwon-si (KR); Jangwon Park, Suwon-si (KR); Seungyoup Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 18/474,846

(22) Filed: Sep. 26, 2023

(65) Prior Publication Data

US 2024/0015817 A1 Jan. 11, 2024

Related U.S. Application Data

(63) Continuation of application No. PCT/KR2022/007315, filed on May 23, 2022.

(30) Foreign Application Priority Data

May 21, 2021 (KR) ........................ 10-2021-0065795

(51) Int. Cl.
*H04W 76/12* (2018.01)
*H04W 76/15* (2018.01)
*H04W 88/16* (2009.01)

(52) U.S. Cl.
CPC ........... *H04W 76/12* (2018.02); *H04W 76/15* (2018.02); *H04W 88/16* (2013.01)

(58) Field of Classification Search
CPC ..... H04W 76/12; H04W 76/15; H04W 88/16; H04W 80/04; H04W 88/18
See application file for complete search history.

(56) References Cited

U.S. PATENT DOCUMENTS 10,225,103 B2 3/2019 Tumuluru
10,700,982 B2 6/2020 Bajaj
(Continued)

FOREIGN PATENT DOCUMENTS

KR 10-2020-0111118 A 9/2020
KR 10-2022-0066790 A 5/2022
WO 2019/217578 A1 11/2019

OTHER PUBLICATIONS

VMware Inc., VMware SD-WAN Partner Guide, VMware SD-WAN 4.3, online update date: Mar. 19, 2020, Retrieved on Jul. 29, 2022, URL: https://docs.vmware.com/en/VMware-SD-WAN/4.3/vmware-sd-wan-partner-guide/GUID-4DBB7C46-8EC7-4F15-B73C-5119C81E1CA7.html#intended-audience-0.
(Continued)

*Primary Examiner* — Charles C Jiang
(74) *Attorney, Agent, or Firm* — Jefferson IP Law, LLP

(57) ABSTRACT

The disclosure relates to a 5$^{th}$ generation (5G) or 6$^{th}$ generation (6G) communication system for supporting a higher data transmission rate. A device in a wireless communication system, which is a software defined (SD)-wide area network (WAN) edge device, is provided. The device includes at least one transceiver and at least one processor, wherein the at least one processor is configured to generate a plurality of wireless internet protocol (IP) links between the SD-WAN edge and an SD-WAN gateway (GW), and select at least one wireless IP link from among the plurality of wireless IP links on the basis of a policy and wireless quality, wherein the wireless quality includes information on a packet loss of each of the plurality of wireless IP links and information on a throughput (Tput) of each of the plurality of wireless IP links.

15 Claims, 19 Drawing Sheets

(56) References Cited

U.S. PATENT DOCUMENTS

| | | | | |
|---|---|---|---|---|
| 10,972,379 | B2 | 4/2021 | Adhikari et al. | |
| 10,979,316 | B2 | 4/2021 | Pasupathy et al. | |
| 11,005,729 | B2 | 5/2021 | Jain et al. | |
| 2018/0278512 | A1 | 9/2018 | Olofsson | |
| 2019/0097754 | A1 | 3/2019 | Yu et al. | |
| 2019/0334820 | A1 | 10/2019 | Zhao | |
| 2020/0304411 | A1 | 9/2020 | Tang et al. | |
| 2020/0389796 | A1 | 12/2020 | Olofsson et al. | |
| 2021/0105225 | A1 | 4/2021 | Stammers et al. | |
| 2021/0160170 | A1* | 5/2021 | Ramaswamy | H04L 45/22 |
| 2022/0231949 | A1* | 7/2022 | Ramaswamy | H04L 45/24 |
| 2023/0275833 | A1 | 8/2023 | Hyun et al. | |

OTHER PUBLICATIONS

Cisco Systems Inc., Next-Generation Mobile Enterprise, 5G, Private LTE, and WiFi6, CISCO Live, 2020 Digital event, DGLT-BRKSPM-2013, Las Vegas, NV, May 31, 2020-Jun. 4, 2020, Retrieved on Jul. 29, 2022, URL: https://www.ciscolive.com/on-demand/on-demand-library.html?zid=pp&search=DGTL-BRKSPM-2013&search.event= 1636046385175002FIR0#.

International Search Report dated Aug. 29, 2022, issued in International Application No. PCT/KR2022/007315.

* cited by examiner

· Packet duplication

· Path bonding

· Best path selection

· Packet switchover

DEVICE AND METHOD FOR ADAPTIVELY CONTROLLING PATH IN WIRELESS COMMUNICATION SYSTEM

CROSS-REFERENCE TO RELATED APPLICATION(S)

This application is a continuation application, claiming priority under § 365(c), of an International application No. PCT/KR2022/007315, filed on May 23, 2022, which is based on and claims the benefit of a Korean patent application number filed on May 21, 2021, in the Korean Intellectual Property Office, the disclosure of which is incorporated by reference herein in its entirety.

BACKGROUND

1. Field

The disclosure relates to a wireless communication system. More particularly, the disclosure relates to a device and a method for adaptively controlling a path in a wireless communication system.

2. Description of Related Art

5$^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6$^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial state of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR user equipment (UE) Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR), and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and a method for adaptively controlling a path in a wireless communication system.

Additional aspects will be set forth in part in the description which follows and, in part, will be apparent from the description, or may be learned by practice of the presented embodiments.

In accordance with an aspect of the disclosure, a device of a software defined (SD)-wide area network (WAN) edge in a wireless communication system is provided. The device includes at least one transceiver and at least one processor, wherein the at least one processor is configured to generate a plurality of wireless Internet protocol (IP) links between the SD-WAN edge and an SD-WAN gateway (GW), and select at least one wireless IP link from among the plurality of wireless IP links based on a policy and wireless quality, and the wireless quality includes information on a packet loss of each of the plurality of wireless IP links and information on a throughput (Tput) of each of the plurality of wireless IP links.

In accordance with another aspect of the disclosure, a device of a software defined (SD)-wide area network (WAN) edge in a wireless communication system is provided. The device includes at least one transceiver, and at least one processor, wherein the at least one processor may be configured to generate a plurality of wireless Internet protocol (IP) links between the SD-WAN edge and an SD-WAN gateway (GW), and select at least one wireless IP link from among the plurality of wireless IP links based on a policy and wireless quality, wherein the wireless quality includes information on a packet loss of each of the plurality of wireless IP links and information on a throughput (Tput) of each of the plurality of wireless IP links.

In an embodiment, the at least one processor may be configured to, in case that at least one of pieces of information on a packet loss of each of the plurality of wireless IP links is equal to or less than a threshold value, transmit an identical packet through at least one wireless IP link among the plurality of wireless IP links based on a packet duplication policy.

In an embodiment, the at least one processor may be configured to, in case that at least one of pieces of information on a throughput of each of the plurality of wireless IP links is equal to or less than a threshold value, transmit a different packet for each of at least one wireless IP link among the plurality of wireless IP links through the at least one wireless IP link based on a packet bonding policy.

In an embodiment, the at least one processor may be configured to, in case that all pieces of information on a packet loss of each of the plurality of wireless IP links are equal to or greater than a threshold value, transmit a packet through a wireless IP link having the highest quality among the plurality of wireless IP links based on a best path selection policy.

In an embodiment, the at least one processor may be configured to, in case that a failure of the at least one wireless IP link has been identified, select a wireless IP link different from the failed wireless IP link from among the plurality of wireless IP links to transmit a packet through the selected wireless IP link, based on a path switchover policy.

In an embodiment, the plurality of wireless IP links may include at least one 5G wireless IP link and at least one 4G wireless IP link in a non-standalone (NSA) environment.

In an embodiment, the plurality of wireless IP links may include at least two 5G wireless IP links in a standalone (SA) environment.

In accordance with another aspect of the disclosure, a method performed by a software defined (SD)-wide area network (WAN) edge in a wireless communication system is provided. The method includes generating a plurality of wireless Internet protocol (IP) links between the SD-WAN edge and an SD-WAN gateway (GW), and selecting at least one wireless IP link from among the plurality of wireless IP links based on a policy and wireless quality, wherein the wireless quality includes information on a packet loss of each of the plurality of wireless IP links and information on a throughput (Tput) of each of the plurality of wireless IP links.

In an embodiment, the method may include, in case that at least one of pieces of information on a packet loss of each of the plurality of wireless IP links is equal to or less than a threshold value, transmitting an identical packet through at least one wireless IP link among the plurality of wireless IP links based on a packet duplication policy.

In an embodiment, the method may include, in case that at least one of pieces of information on a throughput of each of the plurality of wireless IP links is equal to or less than a threshold value, transmitting a different packet for each of the at least one wireless IP link among the plurality of wireless IP links through the at least one wireless IP link based on a packet bonding policy.

In an embodiment, the method may include, in case that all pieces of information on a packet loss of each of the plurality of wireless IP links are equal to or greater than a threshold value, transmitting a packet through a wireless IP link having the highest quality among the plurality of wireless IP links based on a best path selection policy.

In an embodiment, the method may include, in case that a failure of the at least one wireless IP link has been identified, selecting a wireless IP link different from the failed wireless IP link from among the plurality of wireless IP links and transmitting a packet through the selected wireless IP link, based on a path switchover policy.

In an embodiment, the plurality of wireless IP links may include at least one 5G wireless IP link and at least one 4G wireless IP link in a non-standalone (NSA) environment.

In an embodiment, the plurality of wireless IP links may include at least one 5G wireless IP link and at least one 4G wireless IP link in a non-standalone (NSA) environment.

In an embodiment, the plurality of wireless IP links may include at least two 5G wireless IP links in a standalone (SA) environment.

In accordance with an aspect of the disclosure, a device of a software defined (SD)-wide area network (WAN) gateway (GW) in a wireless communication system is provided. The method includes at least one transceiver, and at least one processor, wherein the at least one processor may be configured to select at least one wireless Internet protocol (IP) link from among the plurality of wireless IP links based on a policy and wireless quality, wherein the plurality of wireless IP links include a plurality of wireless IP links between an SD-WAN edge and the SD-WAN gateway, and the wireless quality includes information on a packet loss of each of the plurality of wireless IP links and information on a throughput (Tput) of each of the plurality of wireless IP links.

In an embodiment, the at least one processor may be configured to, in case that at least one of pieces of information on a packet loss of each of the plurality of wireless IP links is equal to or less than a threshold value, transmit an identical packet through at least one wireless IP link among the plurality of wireless IP links based on a packet duplication policy.

In an embodiment, the at least one processor may be configured to, in case that at least one of pieces of information on a throughput of each of the plurality of wireless IP links is equal to or less than a threshold value, transmit a different packet for each of the at least one wireless IP link among the plurality of wireless IP links through the at least one wireless IP link based on a packet bonding policy.

In an embodiment, the at least one processor may be configured to, in case that all the pieces of information on a packet loss of each of the plurality of wireless IP links are equal to or greater than a threshold value, transmit a packet through a wireless IP link having the highest quality among the plurality of wireless IP links based on a best path selection policy.

In an embodiment, the at least one processor may be configured to, in case that a failure of the at least one wireless IP link has been identified, select a wireless IP link different from the failed wireless IP link from among the plurality of wireless IP links to transmit a packet through the selected wireless IP link, based on a path switchover policy.

In an embodiment, the plurality of wireless IP links may include at least one 5G wireless IP link and at least one 4G wireless IP link in a non-standalone (NSA) environment.

In an embodiment, the plurality of wireless IP links may include at least two 5G wireless IP links in a standalone (SA) environment.

In accordance with another aspect of the disclosure, a method performed by a software defined (SD)-wide area network (WAN) gateway (GW) in a wireless communication system is provided. The method includes selecting at least one wireless Internet protocol (IP) link from among the plurality of wireless IP links based on a policy and wireless quality, wherein the plurality of wireless IP links include a plurality of wireless IP links between an SD-WAN edge and the SD-WAN gateway, and the wireless quality includes information on a packet loss of each of the plurality of wireless IP links and information on a throughput (Tput) of each of the plurality of wireless IP links.

In an embodiment, the method may include, in case that at least one of pieces of information on a packet loss of each of the plurality of wireless IP links is equal to or less than a threshold value, transmitting an identical packet through at least one wireless IP link among the plurality of wireless IP links based on a packet duplication policy.

In an embodiment, the method may include, in case that at least one of pieces of information on a throughput of each of the plurality of wireless IP links is equal to or less than a threshold value, transmitting a different packet for each of at least one wireless IP link among the plurality of wireless IP links through the at least one wireless IP link based on a packet bonding policy.

In an embodiment, the method may include, in case that all pieces of information on a packet loss of each of the plurality of wireless IP links are equal to or greater than a threshold value, transmitting a packet through a wireless IP link having the highest quality among the plurality of wireless IP links based on a best path selection policy.

In an embodiment, the method may include, in case that a failure of the at least one wireless IP link has been identified, selecting a wireless IP link different from the failed wireless IP link from among the plurality of wireless IP links and transmitting a packet through the selected wireless IP link, based on a path switchover policy.

In an embodiment, the plurality of wireless IP links may include at least one 5G wireless IP link and at least one 4G wireless IP link in a non-standalone (NSA) environment.

In an embodiment, the plurality of wireless IP links may include at least one 5G wireless IP link and at least one 4G wireless IP link in a non-standalone (NSA) environment.

In an embodiment, the plurality of wireless IP links may include at least two 5G wireless IP links in a standalone (SA) environment.

A device and a method according to various embodiments of the disclosure adaptively configure a path so as to enable efficient and flexible service operation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
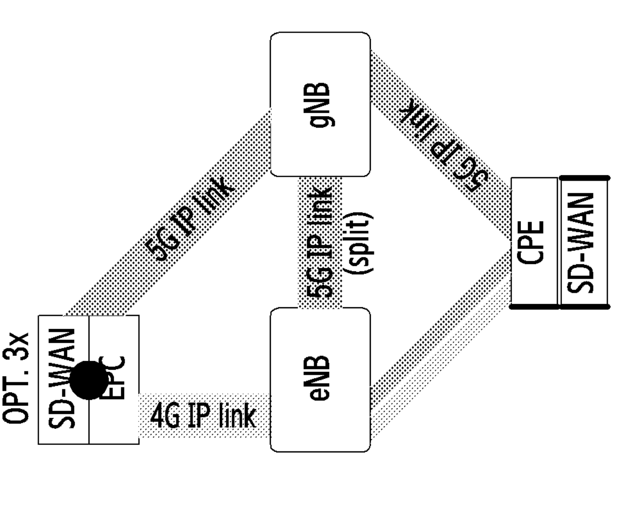
FIG. 1 illustrates an example of a wireless communication system based on 5G non-standalone (NSA) according to an embodiment of the disclosure.
Figure 1:
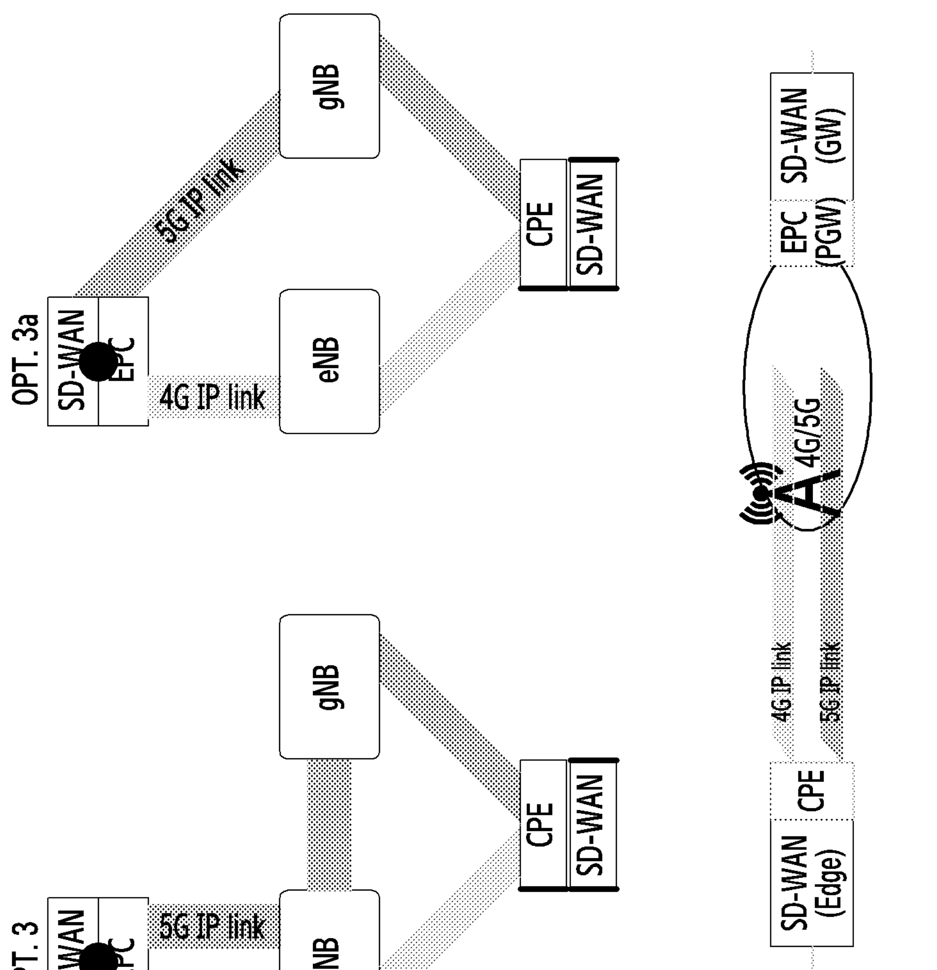

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to a device and a method for generating a plurality of Internet protocol (IP) links and adaptively configuring a path in a 5G non-standalone (NSA) environment or 5G standalone (SA) environment in a software-defined (SD)-wide area network (WAN) in a wireless communication system. Specifically, the disclosure describes techniques for adaptively controlling multiple links by defining signal exchanges, information transferred, and an operation in each entity among an SD-WAN edge, an SD-WAN gateway (GW), and an SD-WAN controller in an SD-WAN interworking with a 5G network in a wireless communication system.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

As used in the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

In the disclosure, various embodiments will be described using terms employed in some communication standards (e.g., the 3rd generation partnership project (3GPP)), but they are only for the sake of illustration. The embodiments of the disclosure may also be easily applied to other communication systems through modifications.

Embodiments of the disclosure propose a method for improving application quality by using a plurality of paths in 4G & 5G wireless networks. Embodiments of the disclosure may be applied to enterprise wireless networks (e.g., 4G & 5G) in which real-time improvement in application quality is important. For example, embodiments of the disclosure may be applied to a business (Biz) fixed wireless access (FWA) that utilizes 4G & 5G wireless networks at enterprise branches. In addition, for example, embodiments of the disclosure may be applied to a 5G specialized network that requires a reliable mobile wireless access such as urban air mobility (UAM). These networks commonly require reliable real-time radio link control that considers the application quality requirements of enterprise or specialized networks.

Conventional wireless network technologies have focused on radio resource optimization based on system statistics of a radio bearer, such as cell congestion or air field. Since these radio resource optimization techniques are basically system statistics of an aggregate transmission path (i.e., an aggregate bearer) of a wireless network, the quality of an application layer cannot be monitored in the wireless network. Furthermore, it is difficult to read, from these statistics, changes in the application layer quality due to the rapidly changing electric field of a wireless section. Therefore, there is no real-time transmission control technology capable of improving the reliability of individual application layers in a wireless section.

With the introduction of 5G networks, the notion of network slicing associated with services has been introduced, and a technology has been introduced to share and optimize the use of the same radio resources for multiple services. However, this technology is not enough for a technology used to aggregately control multiple services with similar characteristics in wireless networks, monitor the quality of individual applications, and improve the same in real time based on the monitored application quality. On the other hand, in wired networks, software-defined wide area network (SD-WAN) technologies have been defined to monitor the quality of the application layer and select transmission paths. These technologies are primarily aimed at managing the connectivity of wide area network (WAN) sections, which are used for inter-branch connections of an enterprise.

A technology for a mobile SD-WAN that applies a wired SD-WAN technology to 4G & 5G wireless networks may be used. This technology is characterized by the architecture for a mobile SD-WAN and technology in the following fields.

A network architecture and a configuration method for ensuring SLA for a 5G wireless section ("SLA in a wireless section") and SLA for WAN access of 5G ("SLA in 5G to a WAN section")

Traffic processing architecture and method for matching 5G slices with SD-WAN connectivity Embodiments of the disclosure propose measures for overcoming the above-described problem based on the mobile SD-WAN architecture. Hereinafter, problems in the current wireless communication environment are described, and embodiments of the disclosure for solving the problems are described.

Problems of Application Quality Assurance Measures in the Existing FWA Environment For FWA services such as the existing home FWA, the quality of the radio access service is determined based on a QoS profile configured based on a condition of the subscriber contract between a mobile network operator (MNO) and a FWA CPE. In particular, the configured QoS profile specifies the quality for a radio bearer of a downlink/uplink. In addition, the wireless network performs operations to ensure the QoS profile of a radio bearer, such as scheduling, priority processing, and retransmission in a wireless section for the radio bearer. However, a radio bearer is an aggregate transmission path, that is, an aggregate bearer along which the traffic of various application layers is collectively forwarded. In addition, since the traffic of enterprise networks is usually encrypted and transmitted, the Biz FWA targeting enterprise networks has no method to distinguish the traffic of application layers in the wireless network. Therefore, the existing Home or Biz FWA has no method to monitor the quality of the application layer, and since the quality monitoring is performed based on an aggregate transmission path in wireless sections or system statistics for wireless cells, there is a limitation to monitor and improve the quality of the application layer.

Problems of the Application Quality Assurance Measures in the Existing Mobile Environment Wireless networks with mobility (hereafter, referred to as mobile networks) have the same problem as that of the application quality assurance measures in the FWA. The mobile network are dealing with scheduling, priority processing, retransmission, etc., in a wireless section based on the QoS profile for a wireless radio bearer. That is, the fundamental difference between the FWA and the mobile network is that resources to be managed that the wireless network monitors and optimizes are different, rather than a difference in user access environment such as fixed or mobile. A wireless network of an MNO has a technology for monitoring and optimizing the aggregate radio resources. In contrast, the quality of the application layer dealt with in the embodiments of the disclosure is targeted at application layer resources, which are impossible to be identified or difficult to be managed individually in a wireless network. In addition, even though a wireless network may generate an aggregate path for a specific application layer, it is not possible to distinguish users of individual application layers, and thus it is not enough as a technology that can monitor and improve enterprise-specific and application-specific qualities.

To address the problems described above, embodiments of the disclosure define operation specifications relating to improving application quality utilizing multiple wireless paths in a wireless section. Based on the mobile SD-WAN architecture, specific methods are proposed to improve the application quality of enterprises in 4G & 5G wireless networks.

Embodiments of the disclosure propose measures for real-time adaptive multilink control for application quality improvement by performing real-time monitoring of the quality of connectivity between the application layers, even in an aggregate transmission path environment of 4G & 5G wireless networks.

Embodiments of the disclosure propose a method for ensuring application quality in an interworking architecture of 4G and 5G wireless networks that do not support network slicing (NSA-based 5G interworking architecture).

Embodiments of the disclosure propose a method for ensuring application quality in an interworking architecture of 4G and 5G wireless networks that support network slicing (SA-based 5G interworking architecture). The disclosure assumes a wireless link of each of 4G and 5G, but embodiments of the disclosure are not limited thereto. Embodiments of the disclosure propose a method by which an operation is enabled in a plurality of 5G wireless network links including a plurality of 5G network slices.

Hereinafter, a wireless network architecture, information handled by each entity, operation for each entity, and overall signaling according to embodiments of the disclosure are described in connection with the drawings. The embodiments of the disclosure are described in the following order.

First, embodiments of the disclosure propose a multilink architecture and a configuration method in a 4G & 5G wireless network with reference to FIGS. 1 through 9. According to an embodiment, a multilink may include an underlay multilink. Further, according to an embodiment, the multilink may include an application overlay (e.g., SD-WAN overlay) link.

Embodiments of the disclosure propose an architecture and a method for monitoring a failure or quality for each of underlay and overlay links with reference to FIGS. 10 to 14.

Embodiments of the disclosure propose an architecture and a method for real-time adaptive multilink control with reference to FIGS. 15 to 18.

Figure 19:
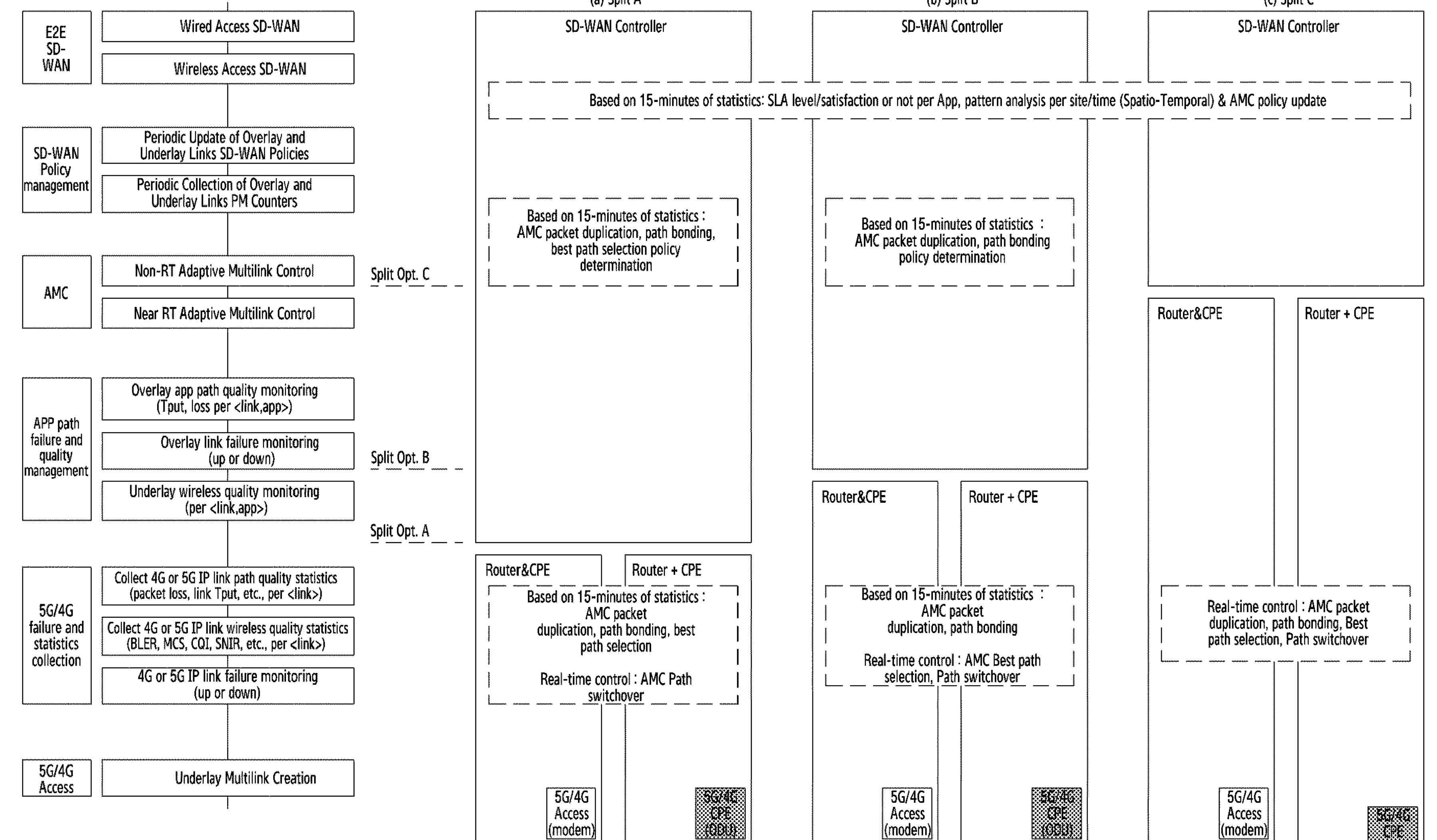
FIG. 19 illustrates an example of adaptive multilink control based on a function split according to an embodiment of the disclosure.

Embodiments of the disclosure propose an architecture and a method for function split of real-time adaptive multilink control with reference to FIG. 19.

FIG. 1 illustrates an example of a wireless communication system based on 5G non-standalone (NSA) according to an embodiment of the disclosure. FIG. 1 illustrates a multilink generation architecture configured with underlay 4G & 5G IP links among an SD-WAN edge {Router, 4G & 5G CPE}, a wireless network {4G eNB, gNB, 4G EPC (PGW)}, and an SD-WAN GW in a 5G non-standalone (NSA) environment.

Referring to FIG. 1, the architecture for generating IP sessions between 4G & 5G CPE and 4G EPC in a 5G NSA environment among the NSA standard interworking architectures defined by 3GPP is illustrated as Opt.3/3a/3x architectures specified in FIG. 1. The difference between these architectures may vary depending on the PDCP processing method among EPC, 4G eNB, and 5G gNB when generating IP sessions between the 4G & 5G CPE and the 4G EPC.

When generating 4G & 5G IP links from the SD-WAN edge to SD-WAN GW, all the IP session generation methods of Opt.3/3a/3x in the 5G NSA environment defined by 3GPP may be supported. In addition, the IP session generation of the 5G NSA of 3GPP may be performed through 4G. The SD-WAN according to embodiments of the disclosure generates additional 4G IP links by using the available 4G in the 5G NSA environment. Accordingly, when the SD-WAN edge and the SD-WAN GW operate in the 5G NSA environment, the SD-WAN generates multiple 4G & 5G IP links between the SD-WAN edge and the SD-WAN GW, while supporting all Opt.3/3a/3x-NSA interworking architectures shown in FIG. 1.

In FIG. 1, an eNB or gNB is illustrated to describe a base station. However, in the embodiments of the disclosure, the base station may be referred to as, in addition to an eNB or gNB, an "access point (AP)", a "5th generation node (5G node)", a "5G NodeB (NB)", a "wireless point", a "transmission/reception point (TRP)", a "distributed unit (DU)", a "radio unit (RU)", a "remote radio head (RRH)", or other terms having an equivalent technical meaning thereof. A base station may be connected to one or more "transmission/reception points (TRPs)". The base station may transmit downlink signals to a terminal and/or receive uplink signals from the terminal via one or more TRPs.

In FIG. 1, a customer premises equipment (CPE) is illustrated to describe a terminal. A CPE is a device used by a user, such as a terminal, that performs communication with a base station through a wireless channel. According to an embodiment, the CPE may communicate with a base station through a wireless channel in a fixed wireless area (FWA). In addition, according to an embodiment, the CPE may communicate with a base station through a wireless channel in a mobile environment. In some cases, the CPE may operate without user involvement. That is, the CPE may be a device that performs machine type communication (MTC) and may not be carried by a user. The CPE may be referred to as a "user equipment (UE)", a "mobile station", a "subscriber station", a "remote terminal", a "wireless terminal", an "electronic device", or a "vehicle terminal", a "user device", or other term having an equivalent technical meaning thereof.

Figure 2:
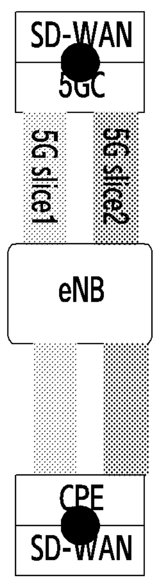
FIG. 2 illustrates an example of a wireless communication system according to 5G standalone (SA) according to an embodiment of the disclosure.
Figure 2:
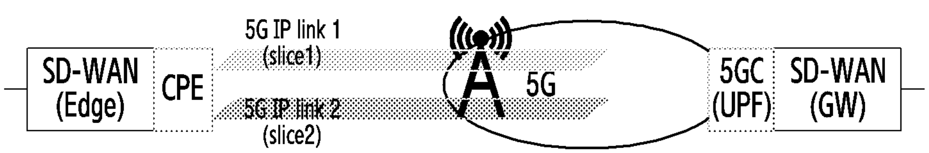

FIG. 2 illustrates an example of a wireless communication system according to a 5G standalone (SA) according to an embodiment of the disclosure. FIG. 2 illustrates a multilink architecture utilizing the configuration of IP links for each 5G slice among an SD-WAN edge {Router, 5G CPE supporting network slicing}, a wireless network {5G gNB, 5G 5GC (UPF)}, and an SD-WAN GW in a 5G standalone (SA) environment. In the SA environment, it is possible to generate a network slice without the help of 4G, through signaling between the 5GC and the CPE that supports SA. The CPE may be connected via gNB to the 5G network (i.e., the 5G core network (5GC). In 3GPP 5G slice, a service-specific network slice considering service characteristics, such as URLLC, eMBB, and mIOT can be generated, and the CPE may support up to 8 network slices. According to an embodiment, an individual network slice generated using the 3GPP standardized procedure may have a one-to-one correspondence with an IP session. Therefore, up to eight IP sessions may be established between the 5G CPE and the 5GC.

Figure 3:
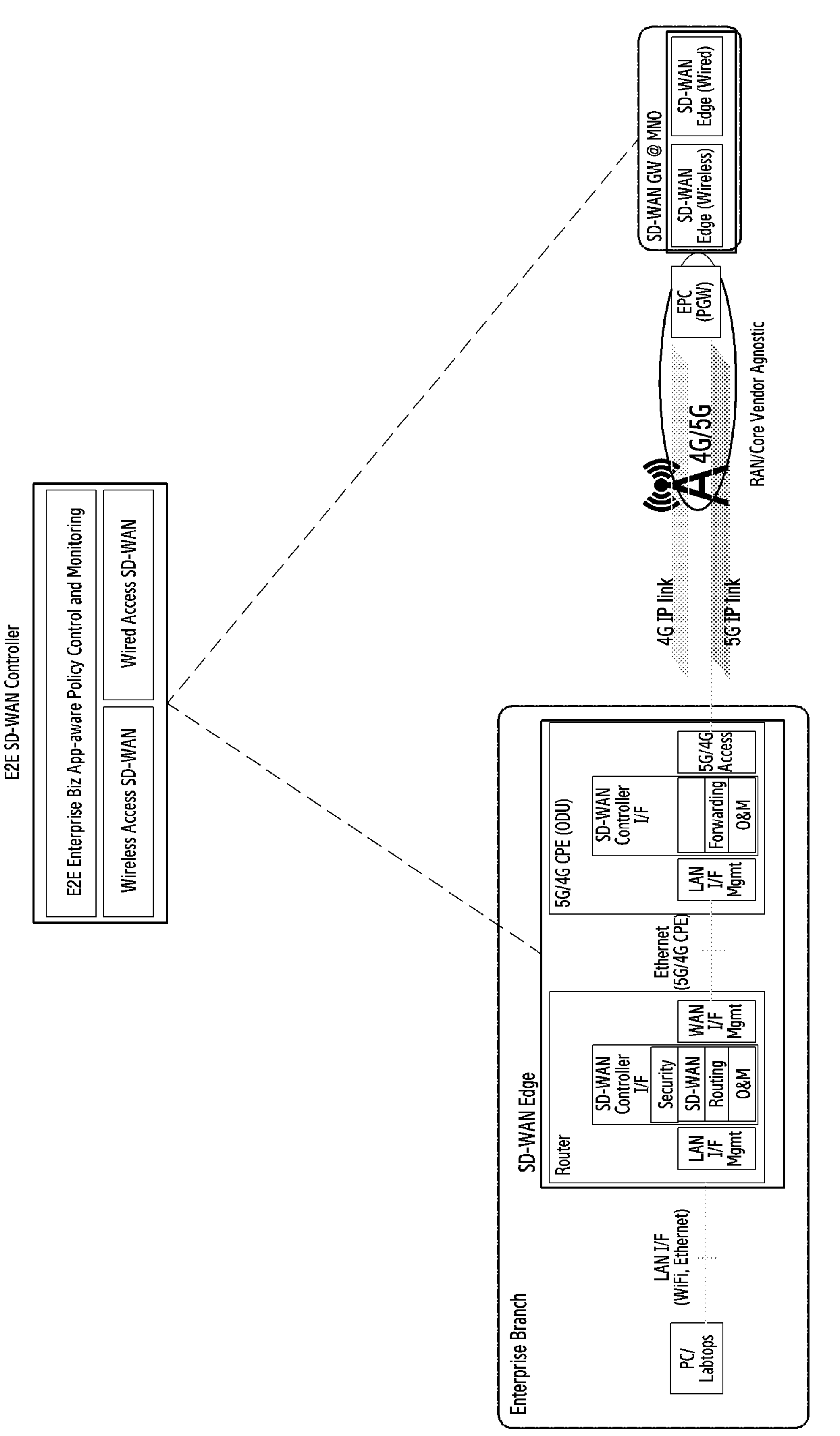
FIG. 3 illustrates a functional configuration of a software-defined (SD)-wide area network (WAN) in a 5G NSA environment according to an embodiment of the disclosure.

FIG. 3 illustrates a functional configuration of a software-defined (SD)-wide area network (WAN) in a 5G NSA environment according to an embodiment of the disclosure. FIG. 3 illustrates a network architecture and a functional configuration of each entity in a 5G non-standalone (NSA) environment.

Referring to FIG. 3, the SD-WAN may include an SD-WAN edge installed in an enterprise branch, an SD-WAN gateway (GW) installed in an MNO network, and an SD-WAN controller. In accordance with an embodiment, the operations of the disclosure may be processed by an SD-WAN controller, operated based on commands from the SD-WAN controller, or performed by the SD-WAN controller, unless otherwise specifically defined herein.

In some embodiments, the SD-WAN GW may be managed in a data center of an enterprise when multiple MNOs are used in the enterprise.

In an embodiment, the SD-WAN edge may include two modules of a router section and a 5G/4G CPE. In an embodiment, the CPE may be integrated with the router. In another embodiment, the CPE may be separated from the router to be connected to the router. Depending on the frequency of the wireless network 4G/5G, a CPE using a higher frequency that has poor propagation characteristics may be connected to the router as an outdoor unit. The functional configurations between the router section and the 5G/4G CPE are the same regardless of whether the router section and the 5G/4G CPE module are integrated or separated.

According to an embodiment, the 5G/4G CPE may include a 5G/4G access (acting as a modem), a LAN I/F (an interface for connection to the router), an internal packet forwarding, and an O&M module. The 5G/4G CPE supports a failure, configuration, accounting, performance, and security (FCAPS) management function through the SD-WAN controller I/F.

According to an embodiment, the router may perform wireless access through the 5G/4G CPE. The router may include a WAN I/F to optionally match wired Internet/MPLS. In addition, the router includes a LAN I/F that provides a service for connection with PC/Lab tops inside the enterprise network. A block, in which policies for security, SD-WAN, and routing between enterprise internal communication from the LAN to WAN I/F and connection outside the enterprise are performed, is defined. In addition, the SD-WAN controller I/F supports a failure, configuration, accounting, performance, and security (FCAPS) management function through the SD-WAN controller I/F.

According to an embodiment, the SD-WAN GW may include an SD-WAN edge (wireless) function to interwork with the SD-WAN edge of enterprise branch through wireless network 4G & 5G, and an SD-WAN edge (wired) for wired WAN access sector such as Internet/MPLS. The SD-WAN edge (wireless) of the SD-WAN GW may interwork with the SD-WAN edge of the enterprise branch to perform Biz App-aware routing/security policies. However, the SD-WAN GW is a more complex system because it is an aggregation equipment that receives traffic and policies of multiple enterprises, and should consider the capacity and system configuration to support multiple enterprises (Multi-Tenant). According to an embodiment, the SD-WAN GW may be installed in a data center of the MNO. In addition, according to an embodiment, the SD-WAN GW may be installed in an enterprise data center to cover multiple MNOs. FIG. 3 illustrates the architecture of the SD-WAN GW installed in an MNO network.

According to an embodiment, the SD-WAN controller is configured to perform domain-specific SD-WAN controller functions such as wireless access SD-WAN and wired access SD-WAN, and E2E SD-WAN controller functions to perform E2E Biz App policy control and monitoring functions between these domains.

Figure 4:
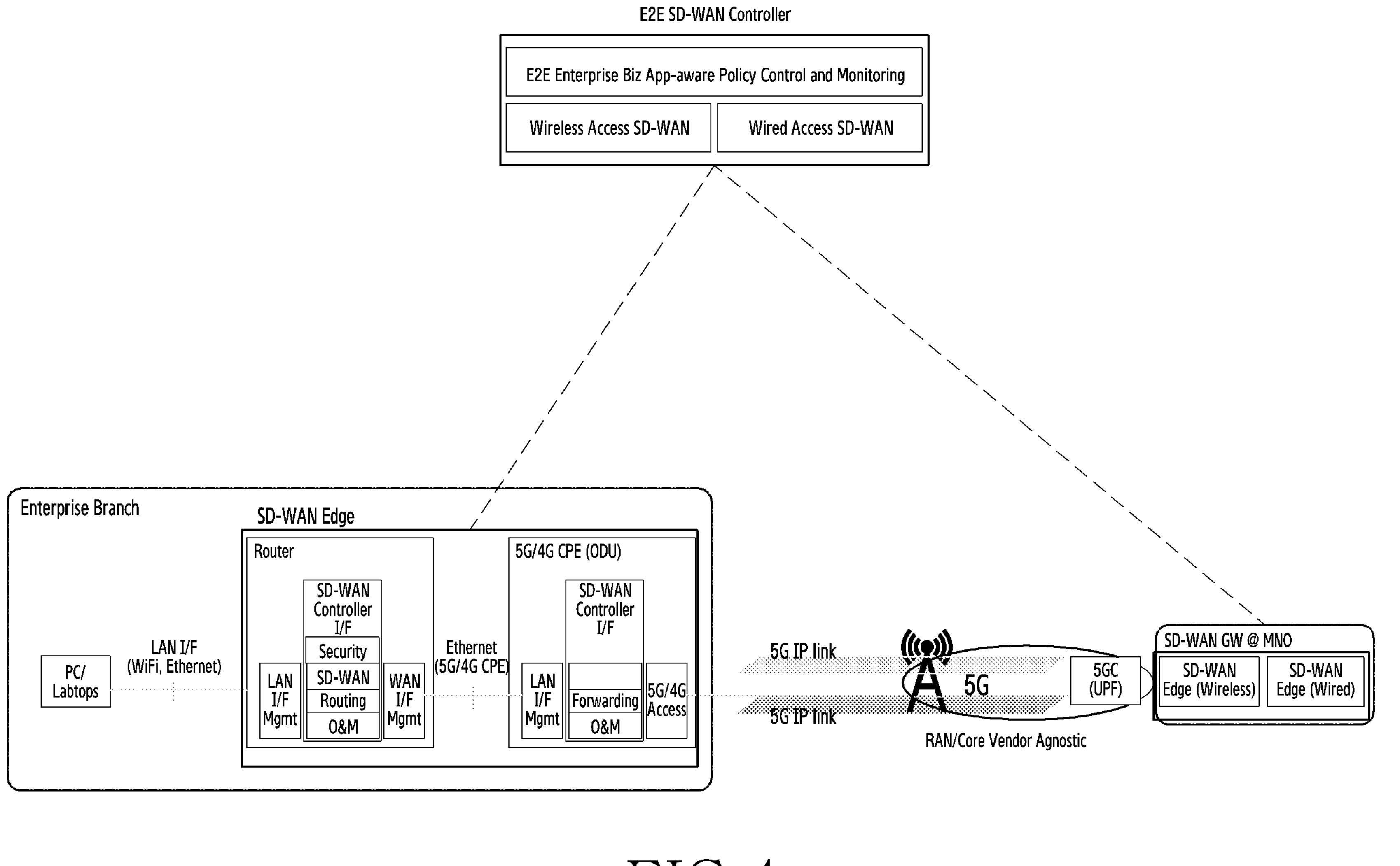
FIG. 4 illustrates a functional configuration of an SD-WAN in a 5G SA environment according to an embodiment of the disclosure.

FIG. 4 illustrates a functional configuration of an SD-WAN in a 5G SA environment according to an embodiment of the disclosure. FIG. 4 illustrates a network architecture and a functional configuration of each entity in a 5G standalone (SA) environment. The description of each entity including the SD-WAN in FIG. 3 may be applied to FIG. 4 in the same or similar manner.

Referring to FIG. 4, the SD-WAN may include an SD-WAN edge installed in an enterprise branch, an SD-WAN GW installed in an MNO network, and an SD-WAN controller. FIG. 4 differs from the network architecture and each functional configuration diagram of the 5G NSA environment of FIG. 3 in that 5GC is used. In a case of the 5G NSA, the EPC, which is an LTE core network, is used, but the 5G SA uses 5GC and accordingly, 4G connection in the CPE is unnecessary. Instead, the CPE is able to configure a multilink from the SD-WAN edge to the SD-WAN GW by utilizing multiple network slices supported by 5G. The 5G/4G CPE of FIG. 3 or 4 supports both the NSA and SA, and may operate based on the 5G/4G access configuration policy. The 5G/4G CPE of FIG. 3 or FIG. 4 may support both the NSA and SA, and may operate based on the 5G/4G access configuration policy.

Referring to FIGS. 1 through 4, a multilink architecture and a configuration method in 4G & 5G wireless networks have been described. Referring to FIG. 1, a multilink architecture including underlay 4G & 5G IP links among an SD-WAN edge {Router, 4G & 5G CPE}, a wireless network {4G eNB, 5G gNB, 4G EPC (PGW)}, and an SD-WAN GW in a 5G Non-standalone (NSA) environment is illustrated. In an embodiment, the wireless communication environment of the disclosure may include an architecture (Opt. 3) in which a 5G IP link from the 4G & CPE to the EPC (PGW) is connected via an eNB. According to an embodiment, the wireless communication environment of the disclosure may include an architecture (Opt. 3a) in which a 5G IP link from the 4G & 5G CPE to the EPC (PGW) is connected via a gNB. According to an embodiment, the wireless communication environment of the disclosure may include an architecture (Opt. 3x) in which a 5G IP link from the 4G & 5G CPE to the EPC (PGW) is connected via a gNB and split via a gNB or an eNB. Referring to FIG. 2, a multilink architecture including a plurality of IP links per underlay 5G network slice among the SD-WAN edge {Router, 4G & 5G CPE supporting network slicing}, the wireless network {5G gNB, 5G 5GC (UPF)}, and the SD-WAN GW in a 5G standalone (SA) environment is illustrated. FIGS. 3 and 4 illustrate the SD-WAN edge, SD-WAN GW, SD-WAN controller, wireless network architecture (e.g., 4G & 5G or 5G), and functional configuration of each entity in a 5G NSA environment.

Hereinafter, based on the above-described wireless communication environment, a method for generating a multilink between an SD-WAN edge and an SD-WAN GW in an SD-WAN according to embodiments of the disclosure is described in FIGS. 5 to 6.

Figure 5:
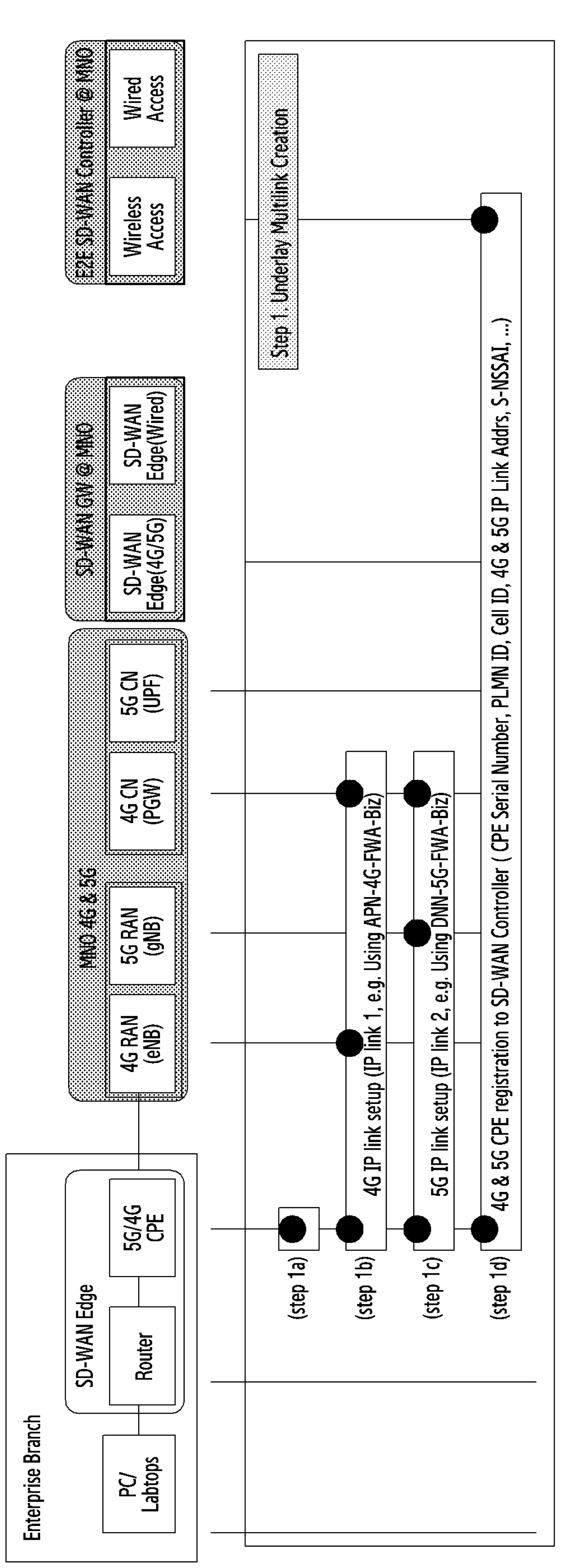
FIG. 5 illustrates an example of generating an underlay multilink between an SD-WAN edge and an SD-WAN gateway (GW) according to an embodiment of the disclosure.

FIG. 5 illustrates an example of generating an underlay multilink between an SD-WAN edge and an SD-WAN gateway according to an embodiment of the disclosure.

Referring to FIG. 5, an overall architecture and procedure for generating an underlay 4G & 5G multilink in an NSA environment is described. The 5G/4G CPE includes information on 4G access point name (APN) and 5G data network name (DNN) to generate a multilink (step 1a of FIG. 5). The underlay 4G & 5G multilink may utilize the network attach and IP session generation procedures for 4G or 5G defined by 3GPP (step 1b to 1c of FIG. 5). After performing a successful network attach procedure, the 5G/4G CPE in the SD-WAN edge may register information such as a 4G IP link address and a 5G IP link address from the MNO network through a registration process with the SD-WAN controller (step 1d of FIG. 5).

The CPE according to embodiments of the disclosure may register, in addition to the IP address information, at least one of accessed wireless network identification information (e.g., public land mobile network (PLMN)), accessed cell information (EUTRA cell global identity (ECGI)/NR cell global identity (NCGI)), and associated network slice identification information (single (S)-network slice selection assistance information (NSSAI)) in a case of 5G SA, in the SD-WAN controller (step 1d of FIG. 5).

The CPE according to embodiments of the disclosure may not perform the process of generating a 4G IP link (step 1b of FIG. 5) in a 5G SA environment. Instead, the CPE may iteratively perform the 5G SA-based network attach procedure defined by 3GPP for a plurality of network slices in the procedure of step 1c. In an embodiment, the CPE may be a 5G CPE supporting a 5G network or a 5G/4G CPE configured to operate a 5G link on a policy basis. The CPE may obtain a 5G IP link address for each of the plurality of network slices and register the associated network slice information in the SD-WAN controller.

Referring to FIG. 5, an underlay multilink generation procedure is described. The underlay multilink generation procedure (step 1) includes the detailed procedures of step 1a to step 1d. To perform the step 1 procedure, the access point name (APN) and data network name (DNN) are subscriber profile information for the enterprise-oriented 5G/4G CPE, which may be configured through prior consultation between enterprise customers and an MNO. For example, the MNO may apply an unlimited rate plan for the CPE of enterprise customers, configure an enterprise-dedicated data network for enterprise customers, and grant policies different from those of general customers' traffic in the same MNO network. In addition, the MNO may designate a enterprise-dedicated packet data network-gateway (P-GW) (4G) or user plane function (UPF) (5G) to process 4G APNs and 5G DNNs for enterprise customers, and may differentiate routing and security policies. The MNO may pre-configure a routing setting between the PGW or UPF and the SD-WAN GW. Even in the 5G SA environment structure (FIG. 4), the MNO may configure routing per network slicing between the UPF (5G) and the SD-WAN GW.

Hereinafter, the underlay multilink generation procedure is described by each functional configuration block of the CPE shown in FIG. 6.

(Step 1a) [5G/4G Access] block C) of the CPE may configure access point name (APN) for enterprise 4G and data network name (DNN) information for enterprise 5G.

- The CPE may establish a setting for the APN for 4G IP link (e.g., APN-4G-FWA-Biz) and DNN for 5G IP link (e.g., DNN-5G-FWA-Biz). When the CPE terminal of an enterprise subscriber performs the 4G & 5G network attach process of 3GPP standard, in case that a preconfigured enterprise subscriber profile is not set, the CPE may reconfigure the enterprise subscriber profile through the reauthorization and OTA procedures.
- The MNO may provide an enterprise-shared APN/DNN or a specific enterprise APN/DNN.

Both single SIM (4G & 5G) and dual SIM (for 4G and 5G) of the same MNO operator may be supported.

(Step 1~1c) The CPE may perform 4G & 5G IP link setup procedures.

[5G/4G Access] block ① of the CPE may generate 4G & 5G IP links through the 3GPP standard network attach process.

Information such as an EPS bearer ID for each enterprise APN/DNN and a QoS profile for each QCI/5QI bearer are profile information of enterprise CPE and are managed as 3GPP network subscriber information in consultation with the enterprise by the MNO.

The MNO may support 4G & 5G static IP assignment policies for enterprise CPEs upon request of the enterprise.

(Step 1d) The CPE may perform a CPE registration procedure.

[O&M] block ② of the CPE performs the CPE registration procedure through controller I/F block ③.

The CPE may forward a CPE identifier (serial or inventory information), accessed 4G & 5G base station information {PLMN ID, ECGI/NCGI}, generated IP link information {APN/DNN, assigned IP Addresses, . . . }, and the like during registration.

If the 5G IP link is generated via network slicing, the CPE may also forward the associated slice information {S-NSSAI} to the SD-WAN controller.

Figure 7:
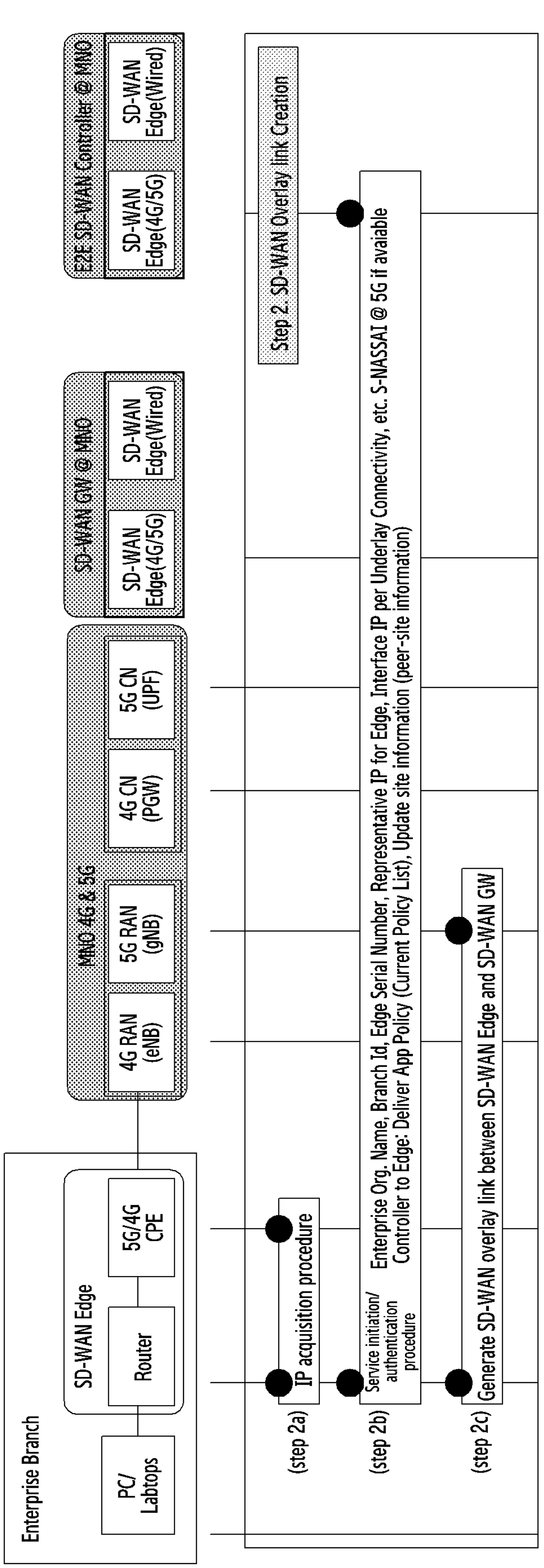
FIG. 7 illustrates an example of generating an application overlay link between an SD-WAN edge and an SD-WAN GW according to an embodiment of the disclosure.

FIG. 7 illustrates an example of the generation of an application overlay link between an SD-WAN edge and an SD-WAN GW according to an embodiment of the disclosure.

Referring to FIG. 7, the overall architecture for generating an SD-WAN overlay link is described after the generation of an IP multilink in an NSA or SA environment is completed. The generation of SD-WAN overlay link is not defined by 3GPP. In this disclosure, acquisition of the IP address between 4G or 5G of the router (step 2a in FIG. 7, or FIG. 8) which is not defined by 3GPP, early service initiation/authentication structure and procedure between the SD-WAN edge/GW and a controller are defined (step 2b in FIG. 7). When the early service initiation/authentication procedure is completed, an inter-peer secure SD-WAN overlay link is established between the SD-WAN edge and the SD-WAN GW (step 2c in FIG. 7). The overlay link generation procedure and IP address acquisition procedure of FIG. 7 may be performed through the functional blocks of the router or CPE of FIG. 8.

Figure 9:
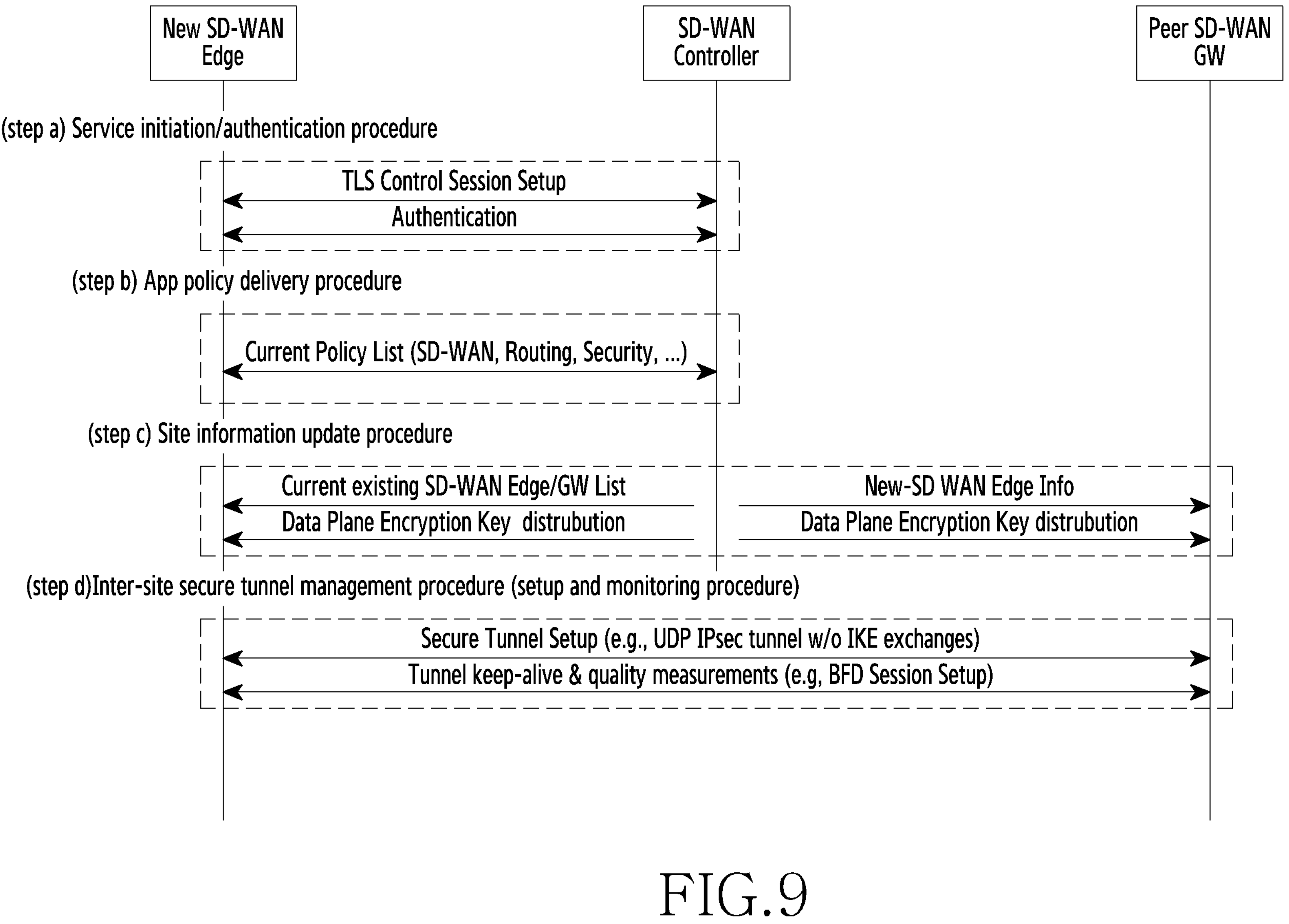
FIG. 9 illustrates a signal flow for monitoring between SD-WAN entities according to an embodiment of the disclosure.

FIG. 9 illustrates a signal flow for monitoring between SD-WAN entities according to an embodiment of the disclosure. FIG. 9 describes the architecture and procedures for service initiation/authorization/policy control for generating an SD-WAN overlay link among the SD-WAN edge, SD-WAN GW, and SD-WAN controller. In particular, encryption key distribution/update for direct secure SD-WAN overlay link between the SD-WAN edge and the SD-WAN GW may not be performed. The SD-WAN controller may distribute and periodically update relevant information and policies.

SD-WAN Overlay Link Generation Method

The main function of step 2 in FIG. 7 is to generate an overlay link, and the procedure may include the detailed procedures of step 2a to step 2c.

(Step 2a) [WAN I/F Mgmt] block ⑪ of the router obtains 4G & 5G IP link address information.

Option 1) CPE [O&M] block ② generates 4G & 5G IP links and then performs broadcast.

Option 2) [WAN I/F Mgmt] block ⑪ of the router acquires the address through CPE [O&M] block C).

Option 3) [O&M] block ⑫ of the router obtains the address information from the controller during the router registration process.

Option 1) and 2), in which the [WAN I/F Mgmt] block ⑪ of the router obtains the 4G & 5G IP link address information, are supported through the Ethernet connection between the router and the CPE. The O&M block of the CPE manages the attributes (IP address, link administrative state {unlocked, locked}, link operational state {up, down}) of the 4G & 5G IP links in real time. Therefore, for changes in these attribute information, the O&M block ② of the CPE may notify the controller or router of failures or status changes, and also support the controller or router to obtain information about these attribute information through the same API.

(Step 2b) [SD-WAN] block ⑬ of the router performs the SD-WAN edge service initiation/authentication/policy configuration procedure (steps a to b in FIG. 9).

The router of the SD-WAN edge receives the ID of the GW [SD-WAN edge (4G/5G)], IP address, Interface IP per underlay connectivity, and related encryption key as a result of the service initiation/authentication through the controller and [Controller I/F] C).

(Step 2c) [SD-WAN] block ⑬ of the router sets up an encrypted SD-WAN link with a peer SD-WAN GW (steps c to d of FIG. 9).

For encapsulation and traffic processing of the encrypted SD-WAN link, the SD-WAN controller forwards the information of the newly registered SD-Edge site to the peer SD-WAN GW. In addition, the SD-WAN controller may also distribute the encryption key for data plane encryption.

The SD-WAN edge and the peer SD-WAN GW may support a secure tunnel by using the data plane encryption key received from the SD-WAN controller.

The controller may establish a setting for path quality between the SD-WAN edge and the peer SD-WAN GW.

When there is application traffic, the SD-WAN edge and SD-WAN GW may perform and support quality monitoring, measurement, and management through the process of receiving application traffic. When there is no application traffic, the SD-WAN edge and SD-WAN GW may perform and support monitoring, measurement, and management of the quality of the path utilizing periodic control traffic (e.g., BFD or TWAMP, UDP-based keep-alive, etc.). For example, the SD-WAN controller may configure policies for periodic control traffic.

Figure 6:
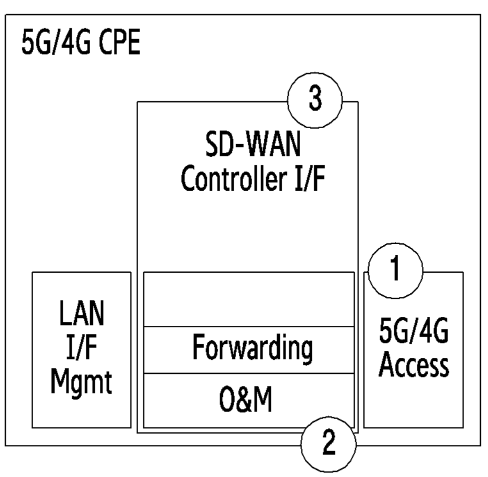
FIG. 6 illustrates an example of a functional configuration of a CPE according to an embodiment of the disclosure.
Figure 8:
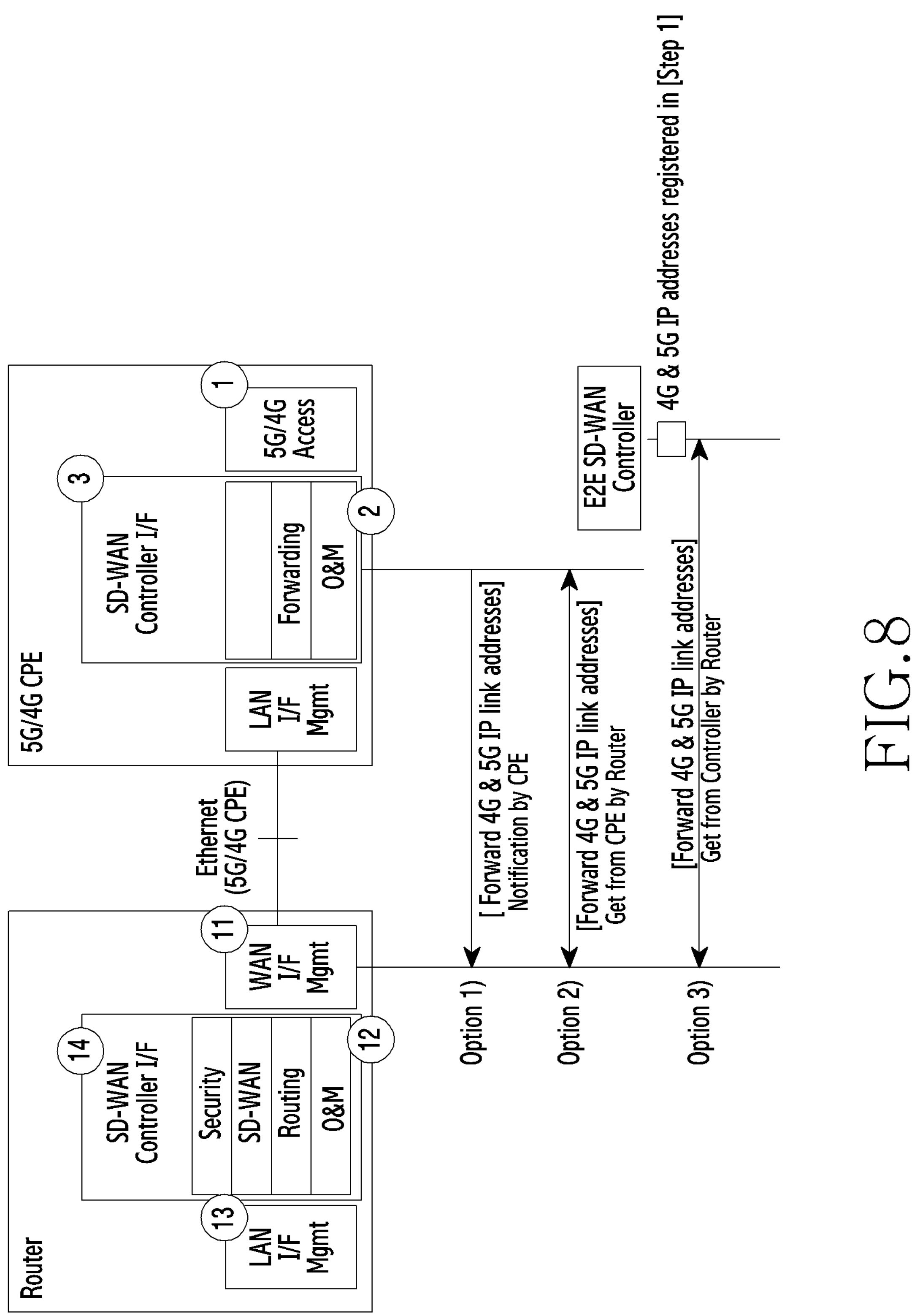
FIG. 8 illustrates an example of IP link address forwarding between functional configurations of a router and a CPE according to an embodiment of the disclosure.

Referring to FIGS. 5 through 6, a procedure for generating an underlay link has been described, and referring to FIGS. 7 through 9, a procedure for generating an overlay link has been described. Hereinafter, FIGS. 10 through 14 describe an SD-WAN architecture for monitoring link-specific failures/quality, and operations of each entity in the SD-WAN.

Figure 10:
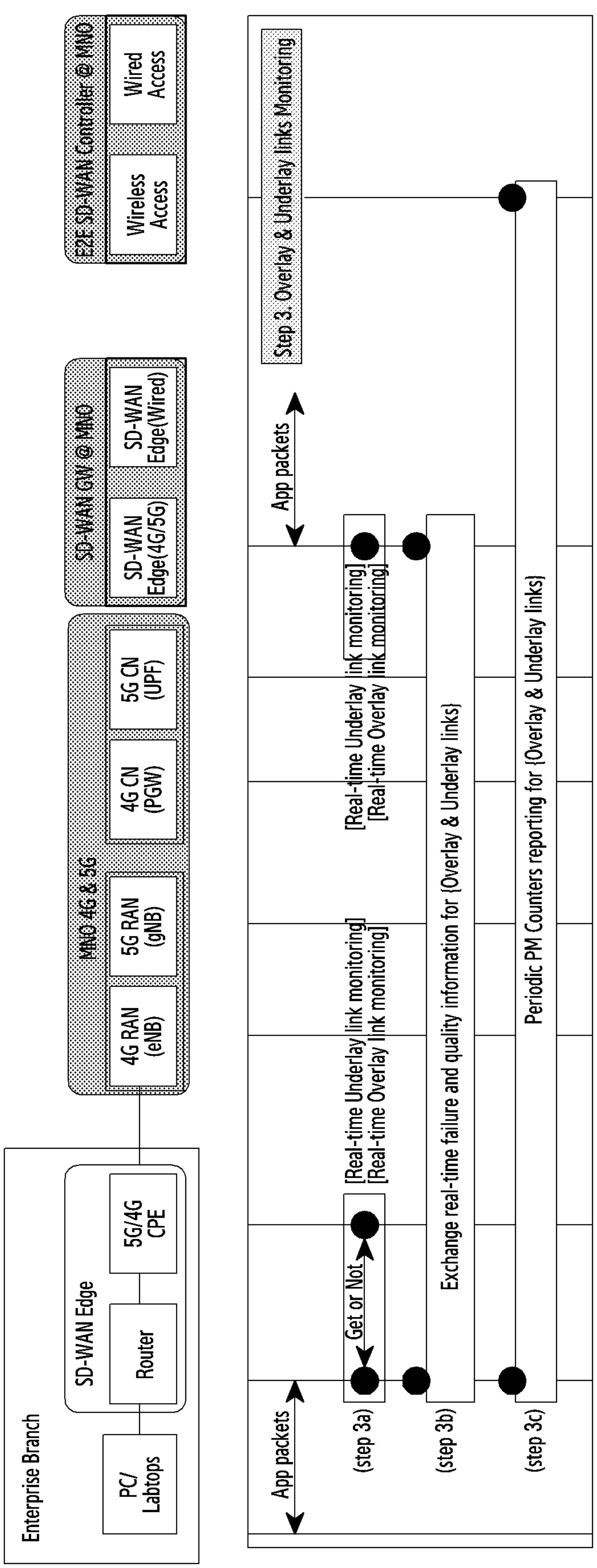
FIG. 10 illustrates an example of monitoring of an underlay link or an overlay link according to an embodiment of the disclosure.

FIG. 10 illustrates an example of monitoring an underlay link or an overlay link according to an embodiment of the disclosure. The underlay link refers to a link generated using the procedures described in FIGS. 5 and 6. The overlay link refers to a link generated using the procedures described in FIGS. 7 through 9.

Referring to FIG. 10, a failure/path/quality monitoring and reporting architecture for each link of the SD-WAN edge and SD-WAN GW is described. Specifically, after the generation of the underlay multilink and the SD-WAN overlay link, the SD-WAN edge and SD-WAN GW describe the real-time failure/quality monitoring architecture for each underlay & overlay link.

In the underlay, real-time failure and quality monitoring are performed for each established multilink connection (step 3a of FIG. 10). According to an embodiment, the SD-WAN edge or SD-WAN GW may monitor the failure and quality on the reception (Rx) side for traffic being transmitted and received, and periodically forward the same to the other party (step 3b of FIG. 10). The SD-WAN edge may monitor link failures and quality and periodically forward the same to the SD-WAN GW. Alternatively, the SD-WAN GW may monitor link failures and quality and periodically forward the same to the SD-WAN edge. The transmission end may estimate the transmission (Tx) quality based on the failures and quality received from the other party (step 3b of FIG. 10). The SD-WAN controller receives real-time failures and periodic reception (Rx) path quality for underlay- and overlay-specific links from the SD-WAN edge and SD-WAN GW (step 3c of FIG. 10). Accordingly, the SD-WAN controller may perform quality monitoring for each Biz App in the enterprise, change necessary Biz App-specific Routing/SD-WAN/Security policy, and forward the same to the SD-WAN edge and SD-WAN GW.

The link monitoring procedure of overlay link or underlay link, which is the main function of step 3 of FIG. 10 includes the detailed procedures of step 3a to step 3c, and each procedure is as follows.

Figure 11:
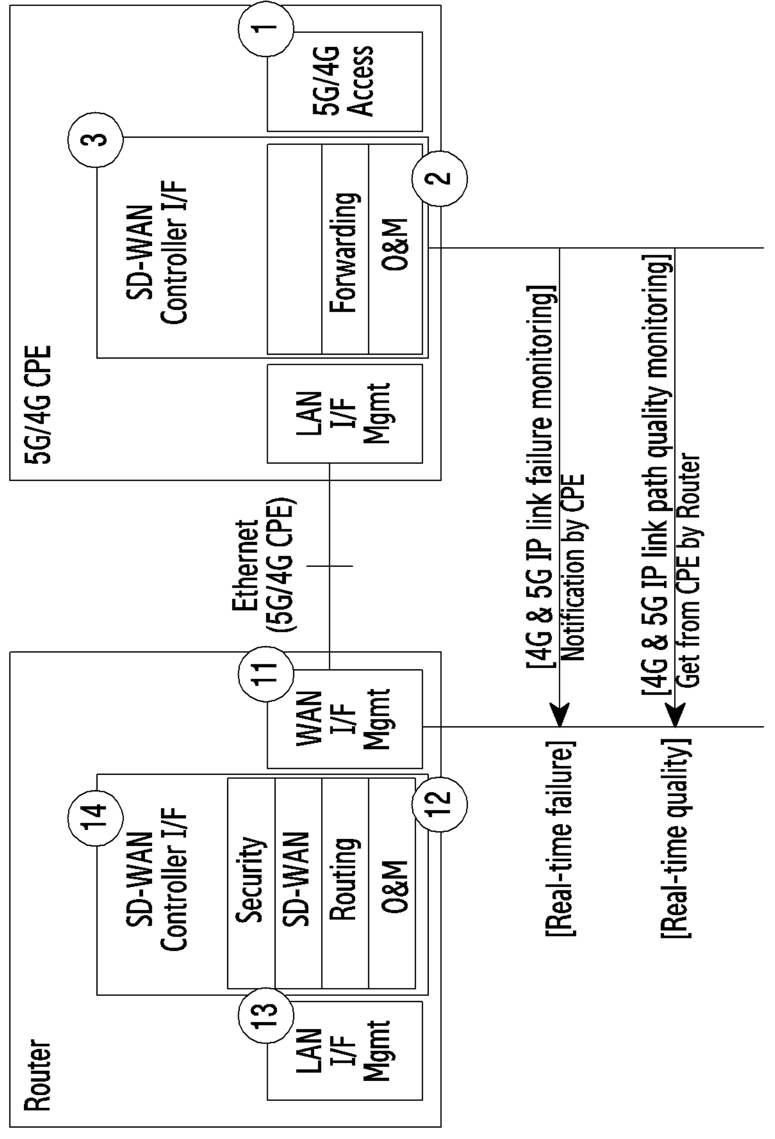
FIG. 11 illustrates an example of forwarding monitoring information between functional configurations of a router and a CPE according to an embodiment of the disclosure.

(Step 3a) The router and 5G/4G CPE of the SD-WAN edge support the architecture shown in FIG. 11 to support the monitoring of overlay and underlay links.

FIG. 11 shows the architecture of failure/path/wireless quality monitoring for each 4G or 5G IP link between the router block and the CPE block of the SD-WAN edge according to an embodiment of the disclosure.

- The 5G/4G CPE notifies the router in real-time when an underlay 4G & IP link failure occurs.
- The router obtains the quality of the underlay 4G & 5G IP links from the 5G/4G CPE periodically or as needed.
- 4G & 5G IP link failure/path/wireless quality are exchanged between [WAN I/F Mgmt] block ⑪ of the router and [O&M] block ② of the CPE.
- SD-WAN edge in which the router and the CPE are integrated follows the same architecture.

Figure 12:
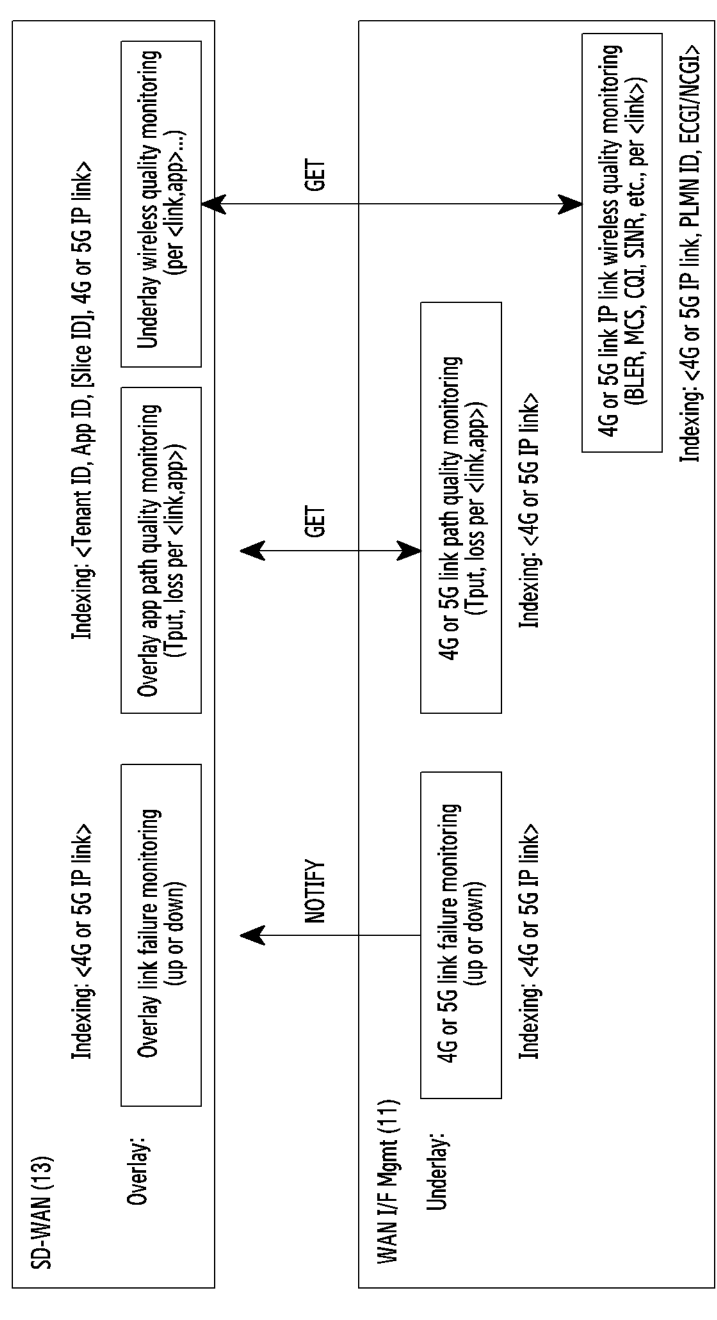
FIG. 12 illustrates an example of signal exchange between an SD-WAN and a WAN input/output management unit according to an embodiment of the disclosure.

(Step 3a) The router of the SD-WAN edge supports the architecture of monitoring overlay & underlay links shown in FIG. 12.

FIG. 12 illustrates an example of signal exchange between the SD-WAN and WAN input/output management according to an embodiment of the disclosure.

Referring to FIG. 12, 4G or 5G-specific IP link failures, 4G or 5G-specific IP link path quality, and 4G or 5G-specific IP link wireless quality may be monitored.

- [SD-WAN] 13 of the router manages failure/path/wireless quality for SD-WAN overlay link.
- [WAN I/F Mgmt] 11 of the router manages the failure/path/wireless quality for the underlay multilink.
- Failure/path/wireless quality for the SD-WAN overlay link may be categorized by at least one of <Tenant ID, App ID, Slice ID, 4G or 5G IP link>. Slice ID is supported in SA environments (e.g., 5GC).
- Failure/path quality for the underlay multilink is categorized by <4G or IP link>.
- The wireless quality of the underlay multilink may include a block error rate (BLER), a modulation and coding scheme (MCS), a channel quality indicator (CQI), and a signal-to-noise ratio (SINR) per <4G or 5G IP link> obtained from the CPE.

(Step 3a) [WAN I/F Mgmt] block ⑪ of the router may receive a notification of the real-time 4G & 5G IP link failure state from the CPE.

- [O&M] block ② of the CPE monitors real-time failure (out of 4G or 5G coverage) and provides a notification of 4G or 5G IP link down to the [WAN I/F Mgmt] block ⑪ of the router, and the [WAN I/F Mgmt] provides a notification of 4G or 5G IP link down to the [SD-WAN] block ⑬.
- Determination as to failure of a wireless section is determined by at least one combination of wireless quality {Tput, BLER, RSRP, SINR, etc.}, a physical radio link failure (RLF), and a beam link failure (BLF). In other words, the radio link failure in terms of application quality may be determined by considering both quality and coverage before a physical radio link disconnection occurs. The CPE determines the radio link failure and then forwards a result of the determination to the router, or the router may determine the wireless link failure based on state information received from the CPE.

(Step 3a) [WAN I/F Mgmt] block ⑪ of the router may monitor real-time 4G & 5G IP link path/wireless quality.

- TX/RX path quality (loss, Tput, etc.) of the 4G or 5G IP link may be obtained from the [O&M] block ② of the CPE.
- Wireless quality (SINR, MCS, BLER, CQI, etc.) of the 4G or 5G IP link may be obtained from the [O&M] block ② of the CPE.

(Step 3a) The SD-WAN GW supports the architecture of monitoring overlay & underlay links of FIG. 12. Similar to the SD-WAN edge, the SD-WAN GW may manage link-specific failures/quality.

- The SD-WAN GW manages failure/path quality for the SD-WAN overlay link.
- The SD-WAN GW manages failure/path quality for the underlay multilink.
- The SD-WAN GW categories failure/path/quality for the SD-WAN overlay according to <Tenant ID, App ID, Slice ID, 4G or IP IP link>. Slice ID is supported in an SA environment.
- Failure/path/quality for the underlay multilink is categorized according to <4G or 5G IP link>.

Figure 13:
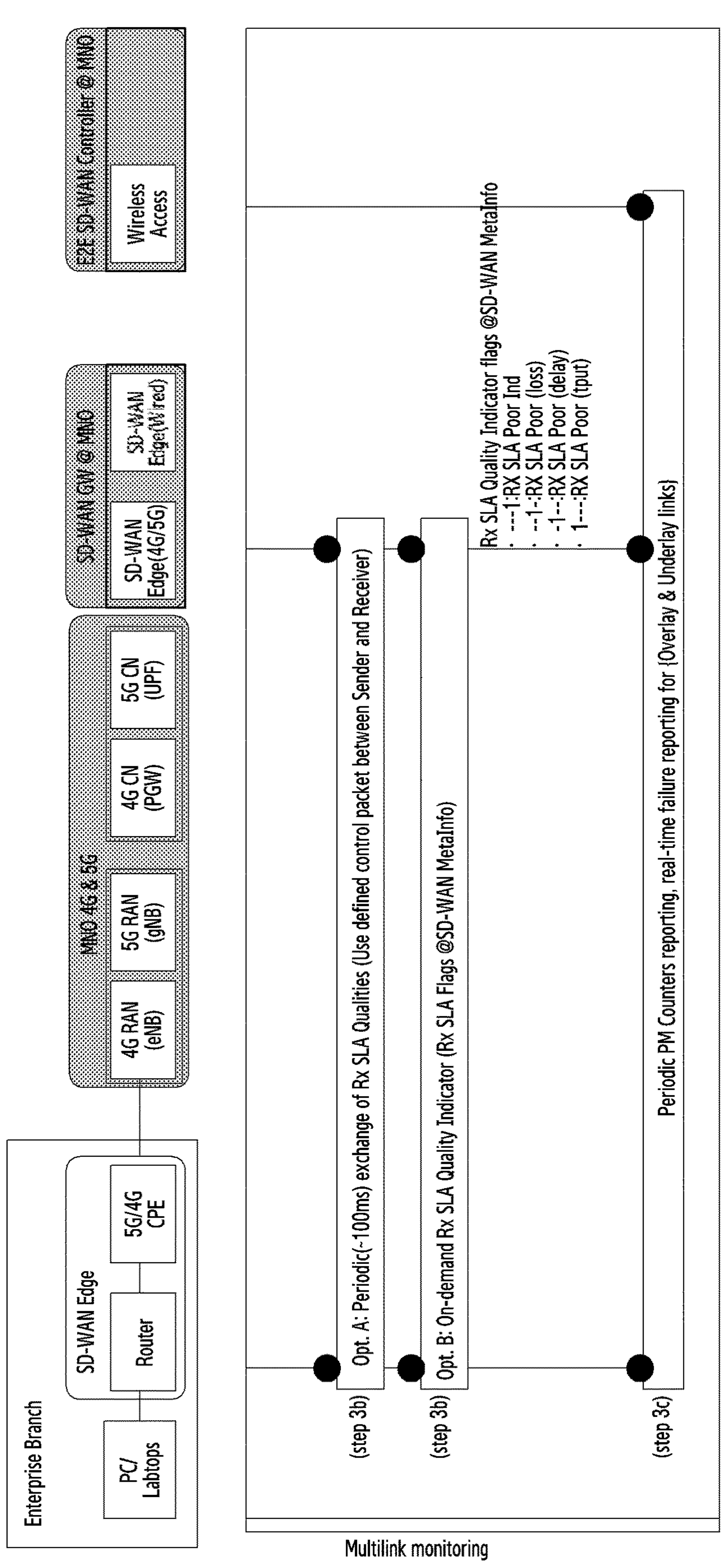
FIG. 13 illustrates an example of periodic monitoring between an SD-WAN controller and an SD-WAN GW/edge according to an embodiment of the disclosure.

FIG. 13 illustrates an example of periodic monitoring between an SD-WAN controller and an SD-WAN GW/edge according to an embodiment of the disclosure.

Referring to FIG. 13, the architecture for monitoring failures/path and wireless quality of the overlay & underlay links is described. Further, FIG. 13 illustrates an example of real-time multilink monitoring and information exchange between the SD-WAN edge and the SD-WAN GW. Real-time multilink failure reporting between the SD-WAN edge/GW and the SD-WAN controller, notification of real-time multilink reception quality degradation, and periodic multilink monitoring reporting between the SD-WAN edge/GW and the SD-WAN controller may be performed.

(Step 3b) The SD-WAN edge and SD-WAN GW support the architecture of FIG. 13 to exchange failures/quality information for the overlay & underlay links.

- Quality exchange information: {App quality <Tenant ID, App ID, Slice ID, 4G or 5G IP link>}, {path quality <4G or 5G IP link>} are supported.
- The real-time quality exchange period is configured in milliseconds to seconds.
- If there is no application traffic on the underlay link for an App traffic inactivity timer (e.g., 100 ms×X times), the underlay link quality may be measured by generating artificial traffic such as SD-WAN control traffic.

(Step 3b) The SD-WAN edge or SD-WAN GW performs a real-time periodic reception quality or real-time quality degradation notification function.

- Opt.A & Opt.B are interchangeable.
- Opt.B is the entire information exchange on the quality of the overlay & underlay links.
- Opt.B is an indicator information for degradation of reception quality based on Rx SLA.
- For the operation of Opt.B, the controller may configure the Rx SLA criteria separately from the Tx SLA.
- The SD-WAN edge and SD-WAN GW support Opt.A and Opt.B according to the policy configured by the controller.

(Step 3c) The SD-WAN edge or SD-WAN GW reports PM statistics data to the controller

- The [SD-WAN] block (13) of the router of the SD-WAN edge supports <Tenant ID, Application ID, [Slice ID], 4G or 5G IP link> for indexing of the reception quality PM statistics.
- SD-WAN GW supports <Tenant ID, Application ID, [Slice ID], 4G or IP link> for indexing of the reception quality PM statistics.
- The PM statistics reporting period is configured in units of 15 m/1 h/24 h.

Figure 14:
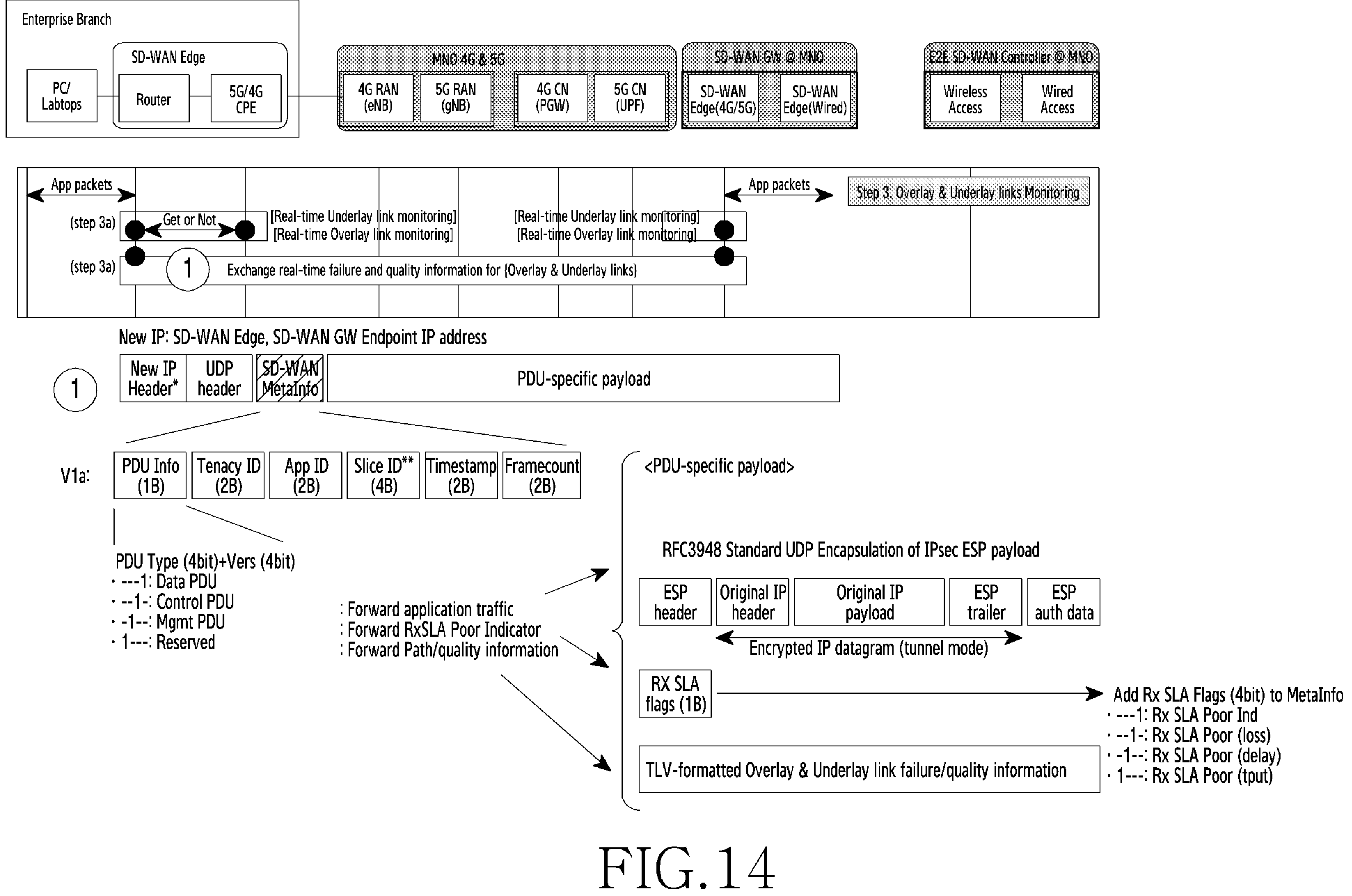
FIG. 14 illustrates an example of SD-WAN meta information according to an embodiment of the disclosure.

FIG. 14 illustrates an example of SD-WAN meta information according to an embodiment of the disclosure.

Referring to FIG. 14, examples of real-time multilink monitoring and information exchange traffic from the SD-WAN edge to the SD-WAN GW are described.

(Step 3b) The SD-WAN edge and the SD-WAN GW may exchange real-time failure/quality information with each other. As real-time failure/quality information, SD-WAN MetaInfo and PDU-specific payloads are described.

- SD-WAN MetaInfo defines encapsulation for forwarding application traffic.
- The MetaInfo is further subdivided to support a data PDU, a control PDU, and an Mgmt PDU, and PDU-specific payloads are forwarded according to PDUs represented by each MetaInfo.
- The data PDU refers to enterprise application layer data forwarded through the SD-WAN overlay link. The data PDU uses the defined encapsulation.
- The control PDU refers to data notified by configuring Rx SLA flags for the real-time reception degradation notification function therewith. The real-time reception degradation notification data includes flags for the type of reception quality degradation such as loss, delay, Tput, etc., as detailed information.
- The Mgmt PDU refers to management (Mgmt) information in the form of TLV for periodic path/quality information forwarding from the SD-WAN edge to the SD-WAN GW. The TLV is defined to represent quality exchange information: {App quality <Tenant ID, App ID, Slice ID, 4G or 5G IP link>}, {path quality <4G or 5G IP link>}.

Hereinafter, a method for adaptive multilink control in real time is described with reference to FIGS. 15 through 18. Adaptive multilink control refers to a technique for adaptively controlling the transmission of multiple paths to provide more efficient paths.

Figure 15:
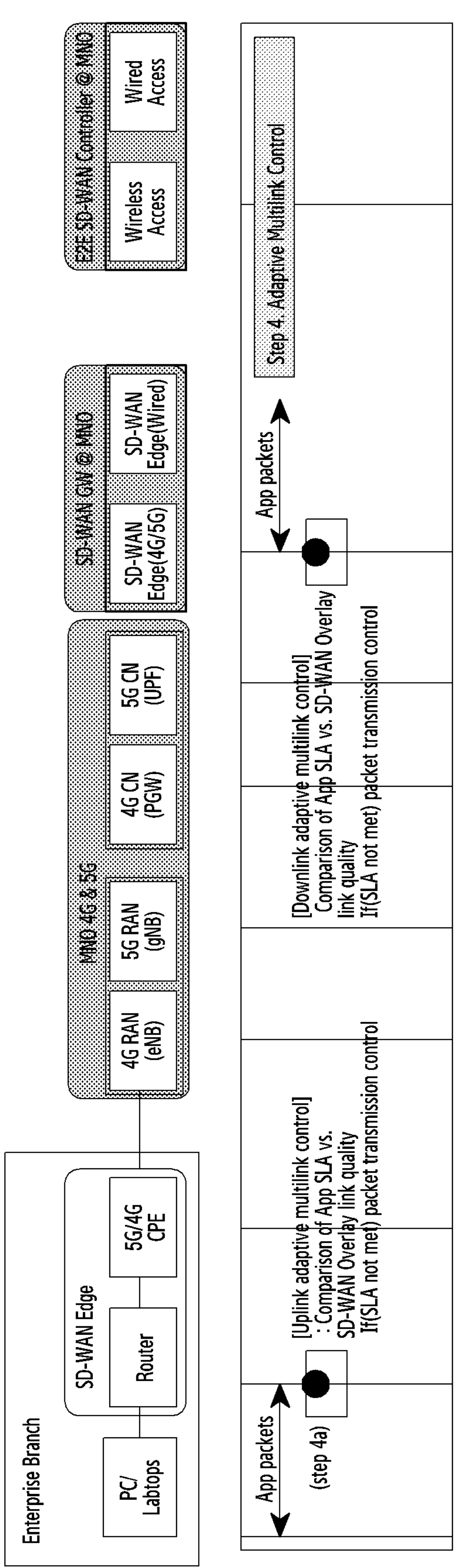
FIG. 15 illustrates an example of adaptive multilink control according to an embodiment of the disclosure.

In FIG. 15, an adaptive multilink control architecture based on comparison of application layer SLA vs. overlay link quality in the SD-WAN edge and SD-WAN GW is described.

Figure 16:
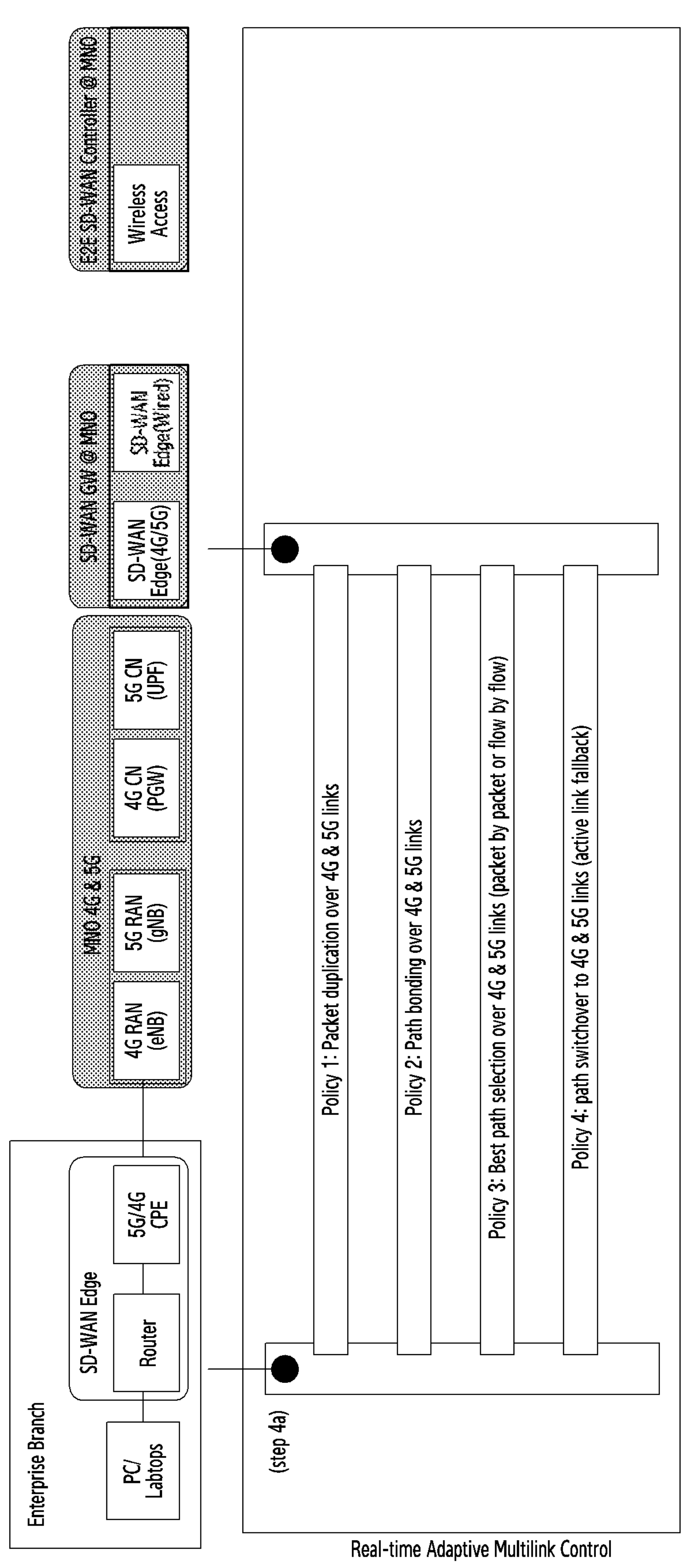
FIG. 16 illustrates an example of policy configuration for adaptive multilink control according to an embodiment of the disclosure.
Figure 17:
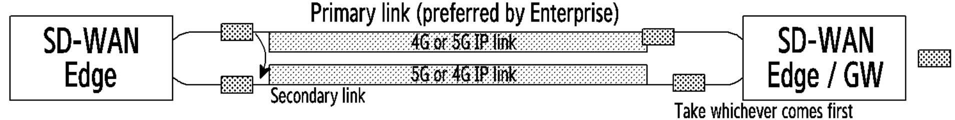
FIG. 17 illustrates an example of a control type for adaptive multilink control according to an embodiment of the disclosure.
Figure 17:
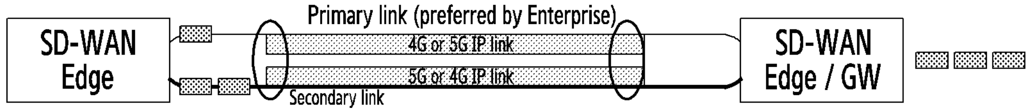
Figure 17:
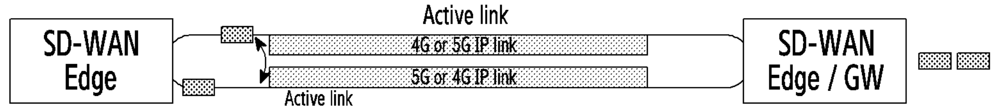
Figure 17:
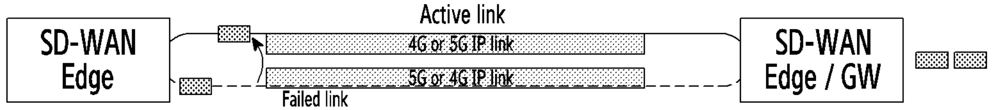

In FIGS. 16 and 17, adaptive multilink control types and policies are described. FIG. 16 describes configuration of a policy between the SD-WAN edge and the SD-WAN GW, and FIG. 17 describes the control types. The control types are as follows.

Figure 18:
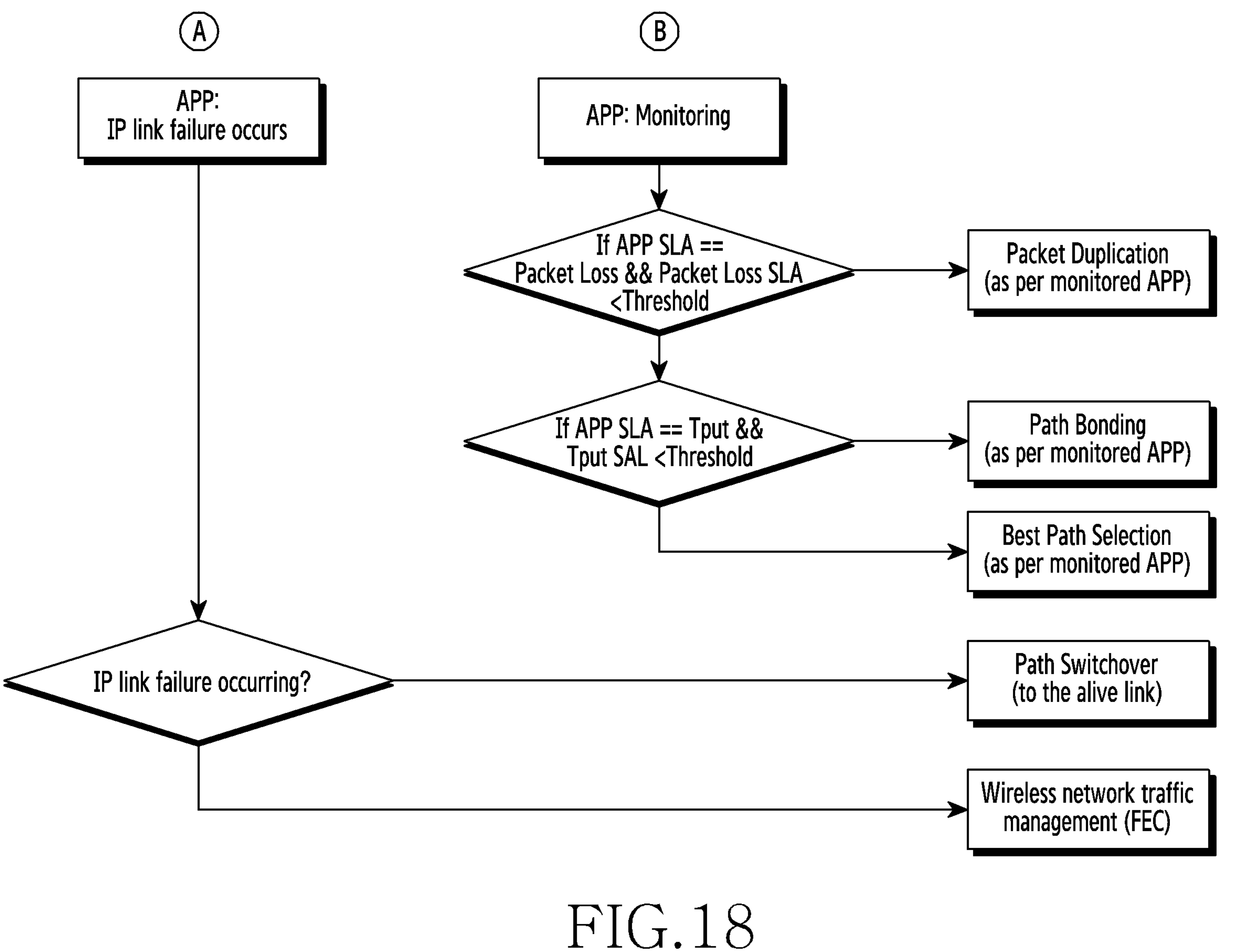
FIG. 18 illustrates a flow of operations for adaptive multilink control according to an embodiment of the disclosure.

- Path Switchover: Switch to an active IP link when a specific IP link failure occurs
- Packet Duplication: Transmit the same packet to multiple IP links simultaneously
- Path Bonding: Transmit different packets to individual IP links simultaneously
- Best Path Selection: Selectively transmit packets to the best IP link to improve SLAs FIG. 18 illustrates an operational method for real-time adaptive multilink control by comparing application layer SLA requirements with actual measured loss and Tput quality of an overlay link.

FIG. 15 illustrates an example of adaptive multilink control according to an embodiment of the disclosure.

Referring to FIG. 15, an adaptive multilink control (AMC) architecture and procedure for real-time failure/quality for each of underlay and overlay links in the SD-WAN edge and SD-WAN GW is described. Based on the required Biz App-specific SLA requirements and measured real-time quality, multiple adaptive multipath control methods may be performed.

Referring to FIG. 15, Adaptive multilink Control (AMC) in step 4 may be performed at the SD-WAN edge and SD-WAN GW. In step 4a, the SD-WAN edge may perform uplink AMC. The SD-WAN edge may compare the quality of the SD-WAN overlay link with SLA in the application layer. In step 4a, the SD-WAN GW may perform downlink AMC. The SD-WAN edge may compare the quality of the SD-WAN overlay link with the SLA in the application layer.

FIG. 16 illustrates an example of a policy configuration for adaptive multilink control according to an embodiment of the disclosure.

Referring to FIG. 16, policies performed by the SD-WAN edge and SD-WAN GW respectively in step 4a of FIG. 15 are subdivided. The AMC according to embodiments of the disclosure supports a packet duplication policy to transmit identical packets for the underlay multilink, a path bonding policy to transmit different packets, a best path selection policy, and a fast path switchover policy in a case of IP link failure.

Referring to FIG. 16, one or more policies may be established between the SD-WAN edge and the SD-WAN GW. These policies relate to the type of control in the AMC described later. According to an embodiment, as a first policy, a packet duplication policy of transmitting an identical packet for the underlay multilink may be established between the SD-WAN edge and the SD-WAN GW. According to an embodiment, a path bonding policy may be established between the SD-WAN edge and the SD-WAN GW as a second policy to transmit different packets. According to an embodiment, a best path selection policy, as a third policy, may be established between the SD-WAN edge and the SD-WAN GW based on selecting the best path. According to an embodiment, a fast path switchover policy, as a fourth policy, may be established between the SD-WAN edge and the SD-WAN GW in a case of IP link failure.

FIG. 17 illustrates an example of a control type of adaptive multilink control according to an embodiment of the disclosure. FIG. 17 describes the architecture and operation of the described adaptive multilink control. The examples shown in FIG. 17 are exemplary and should not be construed as limiting other embodiments of the disclosure.

In other words, other policies may be added in addition to the operations shown in FIG. 17.

The adaptive multilink control procedure of [Step 4] described in FIGS. through 17 is described in more detail.

(Step 4a) The SD-WAN edge and SD-WAN GW perform real-time adaptive multilink control (AMC) by considering the SLA requirements of the application and the actual quality of service.

Determination information is obtained by the SD-WAN edge or SD-WAN GW, based on real-time periodic reception quality (step 3b Opt.A of FIG. 13) or real-time quality degradation notification (step 3b Opt.B of FIG. 13) delivered by the other party.

(Step 4a) The SD-WAN edge or SD-WAN GW supports the real-time adaptive control policies defined in FIGS. 16 and 17.

Packet duplication, path bonding, best path selection, and path switchover for application packets (Step 4a) The packet duplication policy supports the following (FIGS. 16 and 17).

The transmitting end (the SD-WAN edge or SD-WAN GW) transmits the same application data packet (duplicated packets) to both 4G and 5G IP links.

The receiving end acquires a first valid packet among packets received using a multilink.

The packet duplication policy is mainly used when SLA degradation such as loss or delay occurs.

(Step 4a) The path bonding policy supports the following (FIGS. 16 and 17).

The transmitting end (the SD-WAN edge or SD-WAN GW) transmits different application data packets (different packets) to both 4G and 5G IP links.

The receiving end acquires all valid packets received using a multilink.

The path bonding policy is mainly used when SLA degradation such as throughput occurs.

(Step 4a) The best path selection policy supports the following (FIGS. 16 and 17).

The transmitting end (SD-WAN edge or SD-WAN GW) selects only one link with the best link quality from among both 4G and 5G IP links and performs transmission thereto.

The receiving end acquires all valid packets received using a multilink.

This is mainly used to select a better link among multilinks, even when packet duplication and packet bonding are not required. For example, the controller may forward information-based policies such as Biz application traffic characteristics, SLA, and preferred frequency to the SD-WAN edge, and the SD-WAN edge may selectively use the same by considering the underlay wireless link quality.

(Step 4a) The path switchover policy supports the following (FIGS. 16 and 17)

In a case of discovering that either the 4G or 5G IP link has failed, the transmitting end (the SD-WAN edge or SD-WAN GW) performs packet transmission to the other normal IP link.

The receiving end acquires all valid packets received using a multilink.

This is mainly used to minimize the impact of wireless link failures.

(Step 4a) Real-time AMC policies are used together to satisfy the SLA of application quality as much as possible.

Operation based on failures is supported.

Quality-based operation is supported. In addition to an AMC operation based on the received reception quality information, an operation based on a notified quality degradation flag (Rx SLA poor indicators of FIG. 14) is immediately supported.

FIG. 18 illustrates a flow of operations for adaptive multilink control according to an embodiment of the disclosure. Hereinafter, the operations of FIG. 18 are described as being performed by a device of the SD-WAN edge, but may be performed by the SD-WAN GW in addition to the SD-WAN edge.

Referring to FIG. 18, a device may detect a failure of a 4G or 5G IP link in an application layer (indicated by "A"). When an IP link failure is detected, the device may identify whether an IP link failure (e.g., RLF) occurs in a radio access network (RAN). When the RLF occurs even in the RAN, the device may change a path. In other words, the SD-WAN edge may perform, as an AMC, transmission control based on "path switchover". Since traffic may continue to occur in the RAN layer even when the requirements in the application layer are not sufficient, the SD-WAN edge may efficiently control the IP link by identifying whether radio link disconnection occurs in the RAN. On the other hand, when RLF does not exist in the RAN, that is, when the communication state of the RAN is smooth, the SD-WAN edge may perform application layer error control (e.g., forward error correction (FEC)) to improve the quality of reception performance of a RAN IP link that is available but suffers from application layer degradation.

Referring to FIG. 18, the device may monitor a signal in the application layer (indicated by "B"). The device may compare app-specific SLAs with actually measured quality results. When a packet loss is defined using an SLA in the application layer, and the defined packet loss does not satisfy a reference threshold (e.g., equal to or greater than a loss tolerance ratio), the device may perform packet duplication. The packet duplication may be performed for each monitoring app. When Tput is defined using an SLA in the application layer, and the defined Tput does not satisfy a reference threshold (equal to or smaller than a Tput tolerance ratio), the device may perform path bonding. In other words, the SD-WAN edge may perform, as an AMC, transmission control based on "path bonding". When the Tput is defined using an SLA in the application layer, and the defined Tput satisfies a reference threshold on all paths, the device may select an optimal path through best path selection. In other words, the SD-WAN edge may perform, as an AMC, transmission control based on "best path selection".

FIG. 19 illustrates an example of adaptive multilink control based on a function split according to an embodiment of the disclosure. Referring to FIG. 19, a function split architecture and a method of time adaptive multilink control are described. Hereinafter, an SD-WAN edge/GW may include at least one of an SD-WAN edge and an SD-WAN GW.

Referring to FIG. 19, in an SD-WAN, an SD-WAN controller may perform functions according to embodiments of the disclosure together with an SD-WAN edge/GW in a split manner. In other words, the function split refers to the range of real-time adaptive functions that the SD-WAN edge/GW performs on its own, and with regard to other functions, the SD-WAN edge/GW may perform a configured adaptive multilink control policy until periodically changed by the SD-WAN controller.

According to an embodiment, three options may be defined. The SD-WAN edge/GW may perform functions according to a configured option among the following options.

Split A: Perform real-time path switchover function

Split B: Perform (split A function+real-time best path selection function)

Split C: Perform (split B function+real-time path bonding, and packet duplication function)

Referring to FIG. 19, the SD-WAN edge and SD-WAN GW may perform functions according to the function split of adaptive multilink control for real-time failure/quality per underlay & overlay links. Based on the Biz App-specific SLA requirements and measured real-time quality as required by product specifications of the SD-WAN edge, multiple adaptive multilink control methods are performed through function split between the SD-WAN edge and the controller.

Since the SD-WAN Edge/GW is close to the access network of the actual user terminal, real-time control may be possible. The SD-WAN GW may support the same range of function split options as that of the counterpart SD-WAN edge, and the SD-WAN controller may perform functions that are not performed by the SD-WAN GW. In this case, the SD-WAN controller periodically updates the adaptive multilink control policy that should be applied to the SD-WAN Edge/GW. In FIG. 19, Router & CPE may refer to an integrated SD-WAN edge, and Router+CPE may refer to a modular SD-WAN edge. The designation Router & CPE or Router+CPE is based on a method in which the SD-WAN edge is implemented, and the description of a particular implementation should not be construed to limit embodiments of other implementations.

The main structure and supporting functions of AMC function split illustrated in FIG. 19 are as follows.

The SD-WAN edge may support the following function split options for the real-time AMC function.

Split A: The SD-WAN edge only performs real-time path switchover based on the failure of the underlay multilink.

Split B: The SD-WAN edge supports the best path selection function based on actually measured real-time underlay path quality in addition to the split A function of the underlay multilink.

Split C: The SD-WAN edge performs real-time path bonding and packet duplication in addition to split B functions.

The SD-WAN controller should be able to determine options for function splits that can be supported by the SD-WAN edge. The SD-WAN controller may determine options during a service initiation and authentication procedure with the SD-WAN edge, and deliver the determined options to the SD-WAN edge and the peer SD-WAN GW. The SD-WAN controller may determine real-time AMC operations that are not performed in the SD-WAN based on the failure and statistical data collected from the SD-WAN edge & GW, and may periodically configure the determined real-time AMC operations in SD-WAN edge and SD-WAN GW, respectively. The SD-WAN edge and SD-WAN GW may perform the configured policy until the configured AMC policy is changed.

Embodiments of the disclosure describe a method for managing a plurality of IP links in a 5G NSA environment or a 5G SA environment. Based on the generated plurality of IP links (hereinafter referred to as "multilink"), a quality measurement architecture that considers the failure/path/wireless quality for each Biz App in a wireless environment is described. According to embodiments of the disclosure, real-time adaptive multilink control architectures, procedures, and algorithms may be used to provide efficient paths to users in rapidly changing wireless environments in multilink situations. According to embodiments of the disclosure, an AMC function split architecture, in which real-time AMC functions according to various HW and SW functional specifications of the SD-WAN edge are shared with the SD-WAN controller, has been proposed.

Through the embodiments of the disclosure, resilience improvement for Biz Apps in 4G & 5G can be promoted (Real-time AMC performed in the SD-WAN edge & GW). In addition, through the AMC function split according to the capability of the SD-WAN edge, the embodiments of the disclosure can further improve the resilience of Biz Apps on various SD-WAN edge products in an enterprise, such as work from home (WFH) office, SMB office, medium office, and large office. A specific function is performed in the SD-WAN controller (non-real-time AMC) and other specific functions are performed in the SD-WAN edge (real-time AMC), and thus multilink management can be efficiently performed in a wireless network.

In this disclosure, entities for managing a multilink in an SD-WAN are described as an SD-WAN edge, an SD-WAN GW, and an SD-WAN controller, but these are only exemplary implementations, and implementation methods of the embodiments of the disclosure are not limited by specific terms or functions. In order to perform operations according to embodiments of the disclosure, each entity may include at least one processor and at least one transceiver.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Furthermore, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A device of a software defined (SD)-wide area network (WAN) edge in a wireless communication system, the device comprising:
- a transceiver;
- a processor; and
- memory storing instructions that, when executed by the processor, cause the device to:
  - generate a plurality of wireless internet protocol (IP) links between the SD-WAN edge and an SD-WAN gateway (GW),
  - monitor wireless quality including
  - information on a packet loss and
  - information on a throughput of each of the plurality of wireless IP links,
  - determine a transmission control policy among a plurality of transmission control policies for adaptive multilink control based on the monitored wireless quality, and
  - control transmission of packets over the plurality of wireless IP links according to the determined transmission control policy.

2. The device of claim 1, wherein the memory further comprises the instructions that, when executed by the processor, cause the device to:
- in case that at least one of pieces of information on a packet loss of each of the plurality of wireless IP links is equal to or less than a threshold value, apply a packet duplication policy by transmitting an identical packet over at least two of the plurality of wireless IP links.

3. The device of claim 1, wherein the memory further comprises the instructions that, when executed by the processor, cause the device to:
- in case that at least one of pieces of information on a throughput of each of the plurality of wireless IP links is equal to or less than a threshold value, apply a packet bonding policy by transmitting different packets to at least two of the plurality of wireless IP links.

4. The device of claim 1, wherein the memory further comprises the instructions that, when executed by the processor, cause the device to:
- in case that all pieces of information on a packet loss of each of the plurality of wireless IP links are equal to or greater than a threshold value, apply a best path selection policy by transmitting a packet through a wireless IP link having the highest quality among the plurality of wireless IP links.

5. The device of claim 1, wherein the memory further comprises the instructions that, when executed by the processor, cause the device to:
- in case that a failure of the at least one wireless IP link has been identified, apply a path switchover policy by selecting a wireless IP link different from the failed wireless IP link from among the plurality of wireless IP links to transmit a packet through the selected wireless IP link.

6. The device of claim 1, wherein the plurality of wireless IP links comprise at least one 5G wireless IP link and at least one 4G wireless IP link in a non-standalone (NSA) environment.

7. The device of claim 1, wherein the plurality of wireless IP links comprise at least two 5G wireless IP links in a standalone (SA) environment.

8. A method performed by a software defined (SD)-wide area network (WAN) edge in a wireless communication system, the method comprising:
- generating a plurality of wireless internet protocol (IP) links between the SD-WAN edge and an SD-WAN gateway (GW);
- monitoring wireless quality including
- information on a packet loss and
- information on a throughput of each of the plurality of wireless IP links;
- determining a transmission control policy among a plurality of transmission control policies for adaptive multilink control based on the monitored wireless quality; and
- controlling transmission of packets over the plurality of wireless IP links according to the determined transmission control policy.

9. The method of claim 8, further comprising:
- in case that at least one of pieces of information on a packet loss of each of the plurality of wireless IP links is equal to or less than a threshold value, applying a packet duplication policy by transmitting an identical packet over at least two of the plurality of wireless IP links.

10. The method of claim 8, further comprising:
- in case that at least one of pieces of information on a throughput of each of the plurality of wireless IP links is equal to or less than a threshold value, applying a packet bonding policy by transmitting different packets to at least two of the plurality of wireless IP links.

11. The method of claim 8, further comprising:
- in case that all pieces of information on a packet loss of each of the plurality of wireless IP links are equal to or greater than a threshold value, applying a best path selection policy by transmitting a packet through a wireless IP link having the highest quality among the plurality of wireless IP links.

12. The method of claim 8, further comprising:
- in case that a failure of the at least one wireless IP link has been identified:
  - apply a path switchover policy by selecting a wireless IP link different from the failed wireless IP link from among the plurality of wireless IP links; and
  - transmitting a packet through the selected wireless IP link.

13. The method of claim 8, wherein the plurality of wireless IP links comprise at least one $5^{th}$ generation (5G) wireless IP link and at least one $4^{th}$ generation (4G) wireless IP link in a non-standalone (NSA) environment.

14. The method of claim 8, wherein the plurality of wireless IP links comprise at least two 5G wireless IP links in a standalone (SA) environment.

15. A device of a software defined (SD)-wide area network (WAN) gateway (GW) in a wireless communication system, the device comprising:
- a transceiver;
- a processor;
- memory storing instructions that, when executed by the processor, cause the device to:

monitor wireless quality including information on a packet loss and information on a throughput of each of a plurality of wireless IP links, determine a transmission control policy among a plurality of transmission control policies for adaptive multilink control based on the monitored wireless quality, and control transmission of packets over the plurality of wireless IP links according to the determined transmission control policy, wherein the plurality of wireless IP links comprise a plurality of wireless IP links between an SD-WAN edge and the SD-WAN gateway.

* * * * *